United States Patent
Fujita

(10) Patent No.: US 9,697,784 B2
(45) Date of Patent: Jul. 4, 2017

(54) LIQUID CRYSTAL DEVICE, METHOD OF DRIVING LIQUID CRYSTAL DEVICE, AND ELECTRONIC APPARATUS

(71) Applicant: Japan Display Inc., Tokyo (JP)

(72) Inventor: Shin Fujita, Suwa (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 14/962,716

(22) Filed: Dec. 8, 2015

(65) Prior Publication Data

US 2016/0232864 A1    Aug. 11, 2016

Related U.S. Application Data

(63) Continuation of application No. 11/812,348, filed on Jun. 18, 2007, now Pat. No. 9,240,153.

(30) Foreign Application Priority Data

Jul. 3, 2006  (JP) ................................ 2006-183051
Apr. 4, 2007  (JP) ................................ 2007-097989

(51) Int. Cl.
  *G09G 3/36*    (2006.01)
  *G02F 1/1333*  (2006.01)
  (Continued)

(52) U.S. Cl.
  CPC ......... *G09G 3/3614* (2013.01); *G02F 1/1368* (2013.01); *G02F 1/133345* (2013.01);
  (Continued)

(58) Field of Classification Search
  None
  See application file for complete search history.

(56) References Cited

U.S. PATENT DOCUMENTS 5,250,931 A    10/1993    Misawa et al.
5,774,106 A    6/1998     Nitta et al.
(Continued)

FOREIGN PATENT DOCUMENTS

EP    0558059      9/1993
JP    02-312466    12/1990
(Continued)

OTHER PUBLICATIONS

Office Action issued in connection with Korean Patent Application No. 10-2007-0066171, dated Sep. 17, 2013.(6 pages).
(Continued)

*Primary Examiner* — Seokyun Moon
(74) *Attorney, Agent, or Firm* — K&L Gates LLP

(57) ABSTRACT

A liquid crystal device having a first substrate, a second substrate, and liquid crystal provided between the first substrate and the second substrate includes: a plurality of scanning lines provided in the first substrate; a plurality of data lines provided in the first substrate; a plurality of switching elements provided in correspondence with intersections of the plurality of scanning lines and the plurality of data lines; a plurality of pixel electrodes connected to the plurality of switching elements; a common electrode provided in correspondence with the pixel electrodes; a control circuit that alternately supplies a first voltage and a second voltage higher than the first voltage to the common electrode; and a data line driving circuit that alternately supplies a positive-polarity image signal, of which an electric potential is higher than the first voltage, and a negative-polarity image signal, of which an electric potential is lower than the second voltage, to the plurality of data lines.

24 Claims, 11 Drawing Sheets

(51) Int. Cl.
*G02F 1/1335* (2006.01)
*G02F 1/1362* (2006.01)
*G02F 1/1368* (2006.01)

(52) U.S. Cl.
CPC .. *G02F 1/133514* (2013.01); *G02F 1/136213* (2013.01); *G02F 1/136286* (2013.01); *G09G 3/3655* (2013.01); *G09G 2330/021* (2013.01)

(56) References Cited

U.S. PATENT DOCUMENTS

| | | |
|---|---|---|
| 5,805,247 A | 9/1998 | Oh-e et al. |
| 6,166,714 A | 12/2000 | Kishimoto |
| 6,856,307 B2 | 2/2005 | Osame et al. |
| 6,897,845 B2 | 5/2005 | Ozawa |
| 6,963,335 B2 | 11/2005 | Tanaka et al. |
| RE39,366 E | 10/2006 | Nitta et al. |
| 7,154,466 B2 | 12/2006 | Osame et al. |
| 8,232,932 B2 | 7/2012 | Takahashi et al. |
| 9,240,153 B2 * | 1/2016 | Fujita ................. G09G 3/3655 |
| 2002/0084969 A1 | 7/2002 | Ozawa |
| 2003/0095091 A1 | 5/2003 | Enomoto et al. |
| 2004/0041778 A1 | 3/2004 | Hiraki et al. |
| 2005/0052385 A1 | 3/2005 | Noda |
| 2005/0078078 A1 | 4/2005 | Morita |
| 2005/0146493 A1 | 7/2005 | Kinjo et al. |
| 2005/0212742 A1 | 9/2005 | Nishitani et al. |
| 2005/0212988 A1 | 9/2005 | Nagano et al. |
| 2005/0253829 A1 | 11/2005 | Mamba et al. |
| 2006/0132419 A1 | 6/2006 | Morita |
| 2006/0227096 A1 | 10/2006 | Fujita |
| 2008/0074377 A1 | 3/2008 | Fujita |
| 2008/0079680 A1 | 4/2008 | Fujita |

FOREIGN PATENT DOCUMENTS

| | | |
|---|---|---|
| JP | 05-241124 | 9/1993 |
| JP | 07-104246 | 4/1995 |
| JP | 08-087251 | 4/1996 |
| JP | 10-197848 | 7/1998 |
| JP | 2001-194685 | 7/2001 |
| JP | 2001-306041 | 11/2001 |
| JP | 2002-072989 | 3/2002 |
| JP | 2002-169517 | 6/2002 |
| JP | 2002-196358 | 7/2002 |
| JP | 2002-221941 | 8/2002 |
| JP | 2003-255907 | 9/2003 |
| JP | 2004-117608 | 4/2004 |
| JP | 2005-018077 | 1/2005 |
| JP | 2005-049849 | 2/2005 |
| JP | 2005-062396 | 3/2005 |
| JP | 2005-275056 | 10/2005 |
| JP | 2006-078920 | 3/2006 |
| JP | 2006-139298 | 6/2006 |
| JP | 2008-089851 | 4/2008 |
| JP | 2005-300948 | 10/2008 |
| KR | 10-0493374 | 8/2005 |
| TW | 2007-13175 | 4/2007 |

OTHER PUBLICATIONS

Japanese Patent Office, Office Action issued in connection with Japanese Patent Application No. 2007-097989, dated Aug. 5, 2008. (3 pages).

Japanese Patent Office, Office Action issued in connection with Japanese Patent Application No. 2007-171633, dated Aug. 5, 2008. (3 pages).

Japanese Patent Office, Notification of reasons for refusal issued in connection with Japanese Patent Application No. 2007-171634, dated Jul. 3, 2012. (3 pages).

Japanese Office Action issued Apr. 3, 2012, for corresponding Japanese Appln. No. 2007-171632.

Japanese Office Action issued Feb. 14, 2012, for corresponding Japanese Appln. No. 2007-171634.

U.S. Appl. No. 11/652,623, filed Jan. 12, 2007 in the name of Shin Fujita.

* cited by examiner

CROSS-SECTIONAL VIEW TAKEN ALONG LINE III-III

LIQUID CRYSTAL DEVICE, METHOD OF DRIVING LIQUID CRYSTAL DEVICE, AND ELECTRONIC APPARATUS

CROSS REFERENCES TO RELATED APPLICATIONS

The present application is a continuation application of U.S. patent application Ser. No. 11/812,348, filed Jun. 18, 2007, which application claims priority to Japanese Priority Patent Application JP2007-097989, filed in the Japan Patent Office on Apr. 4, 2007, and Japanese Priority Patent Application JP2006-183051, filed in the Japan Patent Office on Jul. 3, 2006, the entire contents of which are hereby incorporated by reference.

BACKGROUND

1. Technical Field

The present invention relates to a liquid crystal device, a driving circuit of a liquid crystal device, a method of driving a liquid crystal device, and an electronic apparatus.

2. Related Art

Liquid crystal devices are known examples of display devices. For example, such a liquid crystal device may include a liquid crystal panel and a backlight that supplies light to the liquid crystal panel.

A liquid crystal panel is configured to include an element substrate, a counter substrate disposed opposite the element substrate, and liquid crystal provided between the element substrate and the counter substrate.

The element substrate includes a plurality of scanning lines and a plurality of capacitive lines provided alternately with predetermined gaps therebetween, a plurality of data lines that cross the plurality of scanning lines and the plurality of capacitive lines and are provided with predetermined gaps therebetween, a scanning line driving circuit connected to the plurality of scanning lines, a data line driving circuit connected to the plurality of data lines, and a capacitive line driving circuit connected to the plurality of capacitive lines.

Pixels are provided at intersections of the scanning lines and the data lines. A pixel is configured to include a pixel capacitor having a pixel electrode and a common electrode, a thin film transistor (hereinafter, referred to as 'TFT') serving as a switching element, and a storage capacitor having one electrode connected to a capacitive line another electrode connected to a pixel electrode. A plurality of pixels are arranged in a matrix to form a display area. In each of the pixels, the scanning line is connected to a gate of the TFT, the data line is connected to a source of the TFT, and the pixel electrode and the other electrode of the storage capacitor are connected to a drain of the TFT.

The capacitive line driving circuit supplies a predetermined voltage to each capacitive line.

The scanning line driving circuit supplies a selection voltage for selecting scanning lines to each of the scanning lines in a predetermined order. When a selection voltage is supplied to a scanning line, a TFT connected to the scanning line is turned on.

The data line driving circuit supplies an image signal to each of the data lines and writes an image voltage based on the image signal into a pixel electrode through the TFT that is in the ON state. In this case, the data line driving circuit alternately performs positive-polarity writing and negative-polarity writing. Specifically, the data line driving circuit supplies an image signal, which has a higher voltage (hereinafter, referred to as 'positive polarity') than a voltage of a common electrode, to a data line so as to write an image voltage based on the positive-polarity image signal into a pixel electrode (positive-polarity writing) and supplies an image signal, which has a lower voltage (hereinafter, referred to as 'negative polarity') than the voltage of the common electrode, to a data line so as to write an image voltage based on the negative-polarity image signal into a pixel electrode (negative-polarity writing) in an alternate manner.

The counter substrate has R (red), G (green), and B (blue) color filters provided for each pixel.

The liquid crystal device described above operates as follows.

That is, a selection voltage is sequentially supplied to scanning lines to turn on all TFTs connected to predetermined scanning lines, such that all pixels corresponding to the scanning lines are selected. Then, an image signal is supplied to data lines in synchronization with selection of the pixels. Then, the image signal is supplied to all of the selected pixels through the TFTs that are in the ON state and an image voltage based on the image signal is written into pixel electrodes.

When the image voltage is written into the pixel electrodes, a driving voltage is applied to liquid crystal due to a potential difference between each pixel electrode and a common electrode. When the driving voltage is applied to liquid crystal, the alignment or ordering of molecules of the liquid crystal changes, and accordingly, light that is transmitted through the liquid crystal and is emitted from a backlight changes. When the changed light is transmitted through color filters, gray-scale display is performed. In addition, due to the storage capacitors, the driving voltage applied to liquid crystal is retained for a period of time that is three orders of magnitude longer than a period of time for which the image voltage is written.

The liquid crystal device described above is used for a portable apparatus, for example, and reduction of power consumption has been recently demanded in portable apparatuses. Therefore, JP-A-2002-196358 proposes a liquid crystal device capable of having a reduced power consumption by turning off TFTs and varying a voltage of a capacitive line after writing an image voltage into a pixel electrode.

Hereinafter, an operation of a liquid crystal device for varying a voltage of a capacitive line as disclosed in JP-A-2002-196358 will be described with reference to FIGS. 12 and 13. FIG. 12 is a timing chart illustrating the positive-polarity writing of a liquid crystal device in the related art. FIG. 13 is a timing chart illustrating the negative-polarity writing of a liquid crystal device in the related art. Here, the liquid crystal device in the related art has 320 rows of scanning lines and 240 columns of data lines, for example. In FIGS. 12 and 13, GATE(m) indicates a voltage of an m-th (where, 'm' is an integer satisfying $1 \leq m \leq 320$) row scanning line out of 320 rows of scanning lines, and VST(m) indicates a voltage of an m-th row capacitive line out of 320 rows of capacitive lines. In addition, SOURCE(n) indicates a voltage of an n-th (where, 'n' is an integer satisfying $1 \leq n \leq 240$) column data line out of 240 columns of data lines. In addition, PIX(m,n) indicates a voltage of a pixel electrode included in a pixel, which corresponds to an m-th row and an n-th column, provided at an intersection of an m-th row scanning line and an n-th column data line, and VCOM(m) indicates a voltage of a common electrode included in the pixel corresponding to the m-th row and the n-th column.

First, the positive-polarity writing of a liquid crystal device in the related art will now be described with reference to FIG. 12. At time t51, a scanning line driving circuit supplies a selection voltage to an m-th row scanning line. Accordingly, a voltage GATE(m) of the m-th row scanning line rises and then reaches a voltage VGH at time t52. As a result, all TFTs connected to the m-th row scanning line are turned on.

At time t53, a data line driving circuit supplies a positive-polarity image signal to an n-th column data line. Accordingly, a voltage SOURCE(n) of the n-th column data line rises gradually and then reaches a voltage VP8 at time t54. The voltage SOURCE(n) of the n-th column data line is written, as an image voltage based on the positive-polarity image signal, into the pixel electrode included in the pixel corresponding to the m-th row and the n-th column through a TFT 51 that is in the ON state and is connected to the m-th row scanning line. Accordingly, a voltage PIX(m,n) of the pixel electrode included in the pixel corresponding to the m-th row and the n-th column rises gradually and then reaches a voltage VP8, which is at the same potential level as the voltage SOURCE(n) of the n-th column data line, at time t54.

At time t55, the scanning line driving circuit stops supplying the selection voltage to the m-th row scanning line. Accordingly, the voltage GATE(m) of the m-th row scanning line drops and then reaches a voltage VGL at time t56. As a result, all TFTs 51 connected to the m-th row scanning line are turned off. At the same time, a capacitive line driving circuit supplies a voltage for increasing a voltage of a capacitive line to the m-th row capacitive line. Accordingly, a voltage VST(m) of the m-th row capacitive line rises gradually and then reaches a voltage VSTH at time t57. If the voltage VST(m) of the m-th row capacitive line rises, electric charges equivalent to the amount of voltage increase are distributed between a storage capacitor and a pixel capacitor in all pixels related to the m-th row capacitive line. Accordingly, a voltage PIX(m,n) of the pixel electrode included in the pixel corresponding to the m-th row and the n-th column rises gradually and then reaches a voltage VP9 at time t57.

Next, the negative-polarity writing of a liquid crystal device in the related art will be described with reference to FIG. 13. At time t61, a scanning line driving circuit supplies a selection voltage to an m-th row scanning line. Accordingly, a voltage GATE(m) of the m-th row scanning line rises and then reaches a voltage VGH at time t62. As a result, all TFTs connected to the m-th row scanning line are turned on.

At time t63, a data line driving circuit supplies a negative-polarity image signal to an n-th column data line. Accordingly, a voltage SOURCE(n) of the n-th column data line drops gradually and then reaches a voltage VP11 at time t64. The voltage SOURCE(n) of the n-th column data line is written, as an image voltage based on the negative-polarity image signal, into the pixel electrode included in the pixel corresponding to the m-th row and the n-th column through a TFT that is in the ON state and is connected to the m-th row scanning line. Accordingly, a voltage PIX(m,n) of the pixel electrode included in the pixel corresponding to the m-th row and the n-th column drops gradually and then reaches a voltage VP11, which is at the same potential level as the voltage SOURCE(n) of the n-th column data line, at time t64.

At time t65, the scanning line driving circuit stops supplying the selection voltage to the m-th row scanning line. Accordingly, the voltage GATE(m) of the m-th row scanning line drops and then reaches a voltage VGL at time t66. As a result, all TFTs connected to the m-th row scanning line are turned off. At the same time, a capacitive line driving circuit supplies a voltage for decreasing a voltage of a capacitive line to the m-th row capacitive line. Accordingly, a voltage VST(m) of the m-th row capacitive line drops gradually and then reaches a voltage VSTL at time t67. If the voltage VST(m) of the m-th row capacitive line drops, electric charges equivalent to the amount of voltage drop are distributed between a storage capacitor and a pixel capacitor in all pixels related to the m-th row capacitive line. Accordingly, a voltage PIX(m,n) of the pixel electrode included in the pixel corresponding to the m-th row and the n-th column drops gradually and then reaches a voltage VP10 at time t67.

As described above, in the liquid crystal device according to the related art, a voltage of a capacitive line rises after writing a positive-polarity image voltage into a pixel electrode at the time of the positive polarity writing. For this reason, the voltage of the pixel electrode rises by an amount obtained by adding a voltage, which is increased due to the positive-polarity image voltage, and a voltage increased due to electric charges by which a voltage of a capacitive line rises. Furthermore, in the liquid crystal device according to the related art, a voltage of a capacitive line drops after writing a negative-polarity image voltage into a pixel electrode at the time of the negative polarity writing. For this reason, the voltage of the pixel electrode drops by an amount obtained by adding a voltage, which is decreased due to the negative-polarity image voltage, and a voltage decreased due to electric charges by which a voltage of a capacitive line drops.

Therefore, by varying a voltage of the capacitive line to change a voltage of the pixel electrode with a voltage of the common electrode as a reference, it is possible to increase the amplitude of the driving voltage applied to liquid crystal. Thus, the amplitude of the driving voltage applied to liquid crystal is secured even if the amplitude of an image voltage is small. As a result, the power consumption may be reduced by making the amplitude of the image voltage small.

In the above liquid crystal device according to the related art, electric charges are made to move between a storage capacitor and a pixel capacitor by varying the voltage of a capacitive line, such that the voltage of a pixel electrode is varied. For this reason, in the case when variation in characteristics of the storage capacitor occurs, the electric charges moving between the storage capacitor and the pixel capacitor are affected. Accordingly, even if the same image voltage is written into the pixel electrode, variation occurs in the voltage of the pixel electrode, which causes the display quality to be degraded.

Further, in the case of an IPS (In-plane switching) liquid crystal device or FFS (fringe-field switching) liquid crystal device having a pixel electrode and a common electrode, which form a pixel capacitor, formed on one of a pair of substrates having liquid crystal interposed therebetween, a pixel capacitor and a storage capacitor are integrally formed. However, in the above liquid crystal device according to the related art, the voltage of the capacitive line is varied using a voltage different from the pixel electrode or the common electrode. Accordingly, it is necessary to form an electrode of the storage capacitor connected to the capacitive line separately from the pixel electrode or the common electrode. For this reason, the pixel capacitor and the storage capacitor need to be separately formed. Accordingly, in the case of the IPS liquid crystal device or the FFS liquid crystal device in which the pixel capacitor and the storage capacitor are integrally formed, to date, it has been difficult to form the above-described liquid crystal device according to the related art.

SUMMARY

An advantage of some aspects of the invention is that it provides a liquid crystal device in which the display quality is not degraded even if variation in characteristics of a storage capacitor occurs. In particular, an advantage of some aspects of the invention is that it provides a liquid crystal device that has a pixel electrode and a common electrode, which form a pixel capacitor, formed on one of a pair of substrates having liquid crystal interposed therebetween and is capable of suppressing the display quality from being degraded, a driving circuit of the liquid crystal device, a method of driving the liquid crystal device, and an electronic apparatus having the liquid crystal device.

According to an aspect of the invention, a liquid crystal device having a first substrate, a second substrate, and liquid crystal provided between the first substrate and the second substrate includes: a plurality of scanning lines provided in the first substrate; a plurality of data lines provided in the first substrate; a plurality of switching elements provided in correspondence with intersections of the plurality of scanning lines and the plurality of data lines; a plurality of pixel electrodes connected to the plurality of switching elements; a common electrode provided in correspondence with the pixel electrodes; a control circuit that alternately supplies a first voltage and a second voltage higher than the first voltage to the common electrode; and a data line driving circuit that alternately supplies a positive-polarity image signal, of which an electric potential is higher than the first voltage, and a negative-polarity image signal, of which an electric potential is lower than the second voltage, to the plurality of data lines.

As a specific control example, the first voltage is supplied to the common electrode and then the selection voltage is supplied to the scanning lines by means of the control circuit and the positive-polarity image signal is supplied to the data lines by means of the data line driving circuit. Alternatively, the negative-polarity image signal may be supplied to the data lines by means of the data line driving circuit while supplying the first voltage to the common electrode and then supplying the selection voltage to the scanning lines by means of the control circuit.

In the liquid crystal device described above, there is provided the control circuit that alternately supplies the first voltage and the second voltage higher than the first voltage to the common electrode. Accordingly, it is possible to supply the positive-polarity image signal to the data lines after supplying the first voltage to the common electrode and to supply the negative-polarity image signal to the data lines after supplying the second voltage to the common electrode. For this reason, unlike the related art described above, electric charges do not move between a storage capacitor and a pixel capacitor. Accordingly, even if variation in characteristics of the storage capacitor occurs, the voltage of the pixel electrode does not vary. As a result, it is possible to suppress the display quality from deteriorating.

Further, in the liquid crystal device described above, the voltage of the common electrode is changed to the first voltage or the second voltage. It is not necessary to change a voltage of a capacitive line, which is connected to one electrode of a storage capacitor, to a voltage different from a pixel electrode or a common electrode provided in a pixel capacitor. Accordingly, since the voltage of one electrode of the storage capacitor can be changed in the same manner as the common electrode, the storage capacitor and the common electrode can be integrally formed. Thus, the liquid crystal device described above is formed to include the pixel electrode and the common electrode, which form the pixel capacitor, formed on the first substrate of the first and second substrates serving as a pair of substrates having liquid crystal interposed therebetween.

Furthermore, in the liquid crystal device according to the aspect of the invention, preferably, the common electrode is provided as a plurality of common electrodes and while one of the first and second voltages is being supplied to one of the plurality of common electrodes, the other one of the first and second voltages is supplied to another one of the common electrodes. In this case, preferably, the common electrodes are provided for all horizontal lines.

In the liquid crystal device described above, the common electrode is provided as a plurality of common electrodes. Accordingly, it is possible to provide either the first voltage or the second voltage from the control circuit to each common electrode. Accordingly, for example, it is possible to supply the first voltage or the second voltage to the common electrode alternately for all horizontal lines and to supply the positive-polarity image signal and the negative-polarity image signal to each data line alternately for all horizontal lines in correspondence with the voltage of the common electrode. Accordingly, by mixing a pixel, in which the positive-polarity writing is performed, and a pixel, in which the negative-polarity writing is performed, within one frame, it is possible to offset a flicker between these pixels. As a result, it is possible to further suppress the display quality from deteriorating. In addition, the common electrodes may be provided for a plurality of horizontal lines without being limited to being provided for all horizontal lines.

Furthermore, in the liquid crystal device according to the aspect of the invention, preferably, the control circuit includes a unit control circuit to which a polar signal for selecting either the first voltage or the second voltage is supplied. In addition, preferably, the unit control circuit includes: a latch circuit that holds the polar signal; and a selection circuit that selectively outputs any one of the first voltage and the second voltage according to the polar signal held by the latch circuit. In the case of separating the common electrode into a plurality of common electrodes corresponding to the scanning lines, it is preferable to provide a plurality of unit control circuits corresponding to the scanning lines. In this case, when a selection voltage is supplied from the scanning line driving to a scanning line adjacent to a scanning line corresponding to the unit control circuit, it is possible to hold the polar signal in the latch circuit.

In the liquid crystal device described above, any one of the first voltage and the second voltage can be selectively supplied to the common electrode by means of the control circuit. Particularly in the case when the common electrode is provided as a plurality of common electrodes corresponding to the scanning lines, it is possible to selectively supply any one of the first voltage and the second voltage to each of the common electrodes.

In addition, in the liquid crystal device described above, when a selection voltage is supplied to a scanning line adjacent to a scanning line corresponding to a unit control circuit, the polar signal is held by the latch circuit. Accordingly, the polar signal is sequentially held in the plurality of unit control circuits on the basis of the selection voltage sequentially supplied to the plurality of scanning lines by the scanning line driving circuit. Thus, since the control circuit transmits sequential polar signals to the plurality of unit control circuits, it is not necessary to provide a sequential transfer circuit called a shift register circuit. As a result, the power consumption can be reduced.

Further, according to another aspect of the invention, a method of driving a liquid crystal device having a plurality of scanning lines, a plurality of data lines, a plurality of switching elements provided in correspondence with intersections of the plurality of scanning lines and the plurality of data lines, a plurality of pixel electrodes connected to the plurality of switching elements, and a common electrode provided in correspondence with the pixel electrodes includes: alternately supplying a first voltage and a second voltage higher than the first voltage to the common electrode; supplying a selection voltage to the plurality of scanning lines in a sequential manner; and alternately supplying a positive-polarity image signal, of which an electric potential is higher than the first voltage, and a negative-polarity image signal, of which an electric potential is lower than the second voltage, to the plurality of data lines. After supplying the first voltage to the common electrode, positive-polarity writing for supplying the positive-polarity image signal to the data lines is performed while supplying the selection voltage to the scanning lines by means of the scanning line driving circuit. After supplying the second voltage to the common electrode, negative-polarity writing for supplying the negative-polarity image signal to the data lines is performed while supplying the selection voltage to the scanning lines. In addition, the common electrode is provided as a plurality of common electrodes and while one of the first and second voltages is being supplied to one of the plurality of common electrodes, the other one of the first and second voltages is supplied to another one of the common electrodes.

Further, according to still another aspect of the invention, a liquid crystal device having a first substrate, a second substrate, and liquid crystal provided between the first substrate and the second substrate includes: a plurality of scanning lines provided in the first substrate; a plurality of data lines provided in the first substrate; a plurality of switching elements provided in correspondence with intersections of the plurality of scanning lines and the plurality of data lines; a plurality of pixel electrodes connected to the plurality of switching elements; and a plurality of common electrodes that are provided in the first substrate and are formed separately from each other. In the liquid crystal device, preferably, the common electrodes are provided for each of at least one horizontal line. In addition, in the liquid crystal device, preferably, while one of a first voltage and a second voltage higher than the first voltage is being supplied to one of the plurality of common electrodes, the other one of the first and second voltages is supplied to another one of the common electrodes. In addition, in the liquid crystal device, preferably, the first and second voltages are alternately supplied to the plurality of common electrodes.

In the liquid crystal device described above, the plurality of common electrodes formed separately from each other are provided in the first substrate formed with the pixel electrodes. Accordingly, it is possible to supply a voltage to each of the common electrodes that are formed separately from each other. For this reason, it is not necessary to change the voltage of the capacitive line. As a result, even in an IPS (In-plane switching) liquid crystal device or an FFS (fringe-field switching) liquid crystal device in which a pixel capacitor and a storage capacitor are integrally formed, it is possible to make the amplitude of a driving voltage applied to liquid crystal large. Thus, even if the amplitude of the image voltage is small, the amplitude of the driving voltage applied to the liquid crystal can be secured.

Furthermore, in the liquid crystal device according to the aspect of the invention, it is preferable to further include an insulating layer provided between the pixel electrodes and the common electrodes so as to form capacitors between the pixel electrodes and the common electrodes.

Furthermore, in the liquid crystal device according to the aspect of the invention, it is preferable to further include a second insulating layer provided between the first substrate and the pixel electrodes or the common electrodes. Furthermore, in the liquid crystal device according to the aspect of the invention, it is preferable to further include an auxiliary common line electrically connected to each of the common electrodes.

For example, the auxiliary common line is provided between adjacent common electrodes along the common electrodes. By connecting the auxiliary common line with the common electrode, it is possible to reduce the time constant of the common electrode. The auxiliary common line is preferably formed of a material having an electrical resistance lower than the common electrode.

The liquid crystal devices described above may be applied as display units of various types of electronic apparatuses, for example. Particularly in the case of applying the liquid crystal devices described above to portable electronic apparatuses, such as digital still cameras or mobile phones, driven by a battery, it is possible to extend the operating time of the battery.

Additional features and advantages are described herein, and will be apparent from the following Detailed Description and the figures.

DETAILED DESCRIPTION

Embodiments of the present application will be described below in detail with reference to the drawings.

First Embodiment

Figure 1:
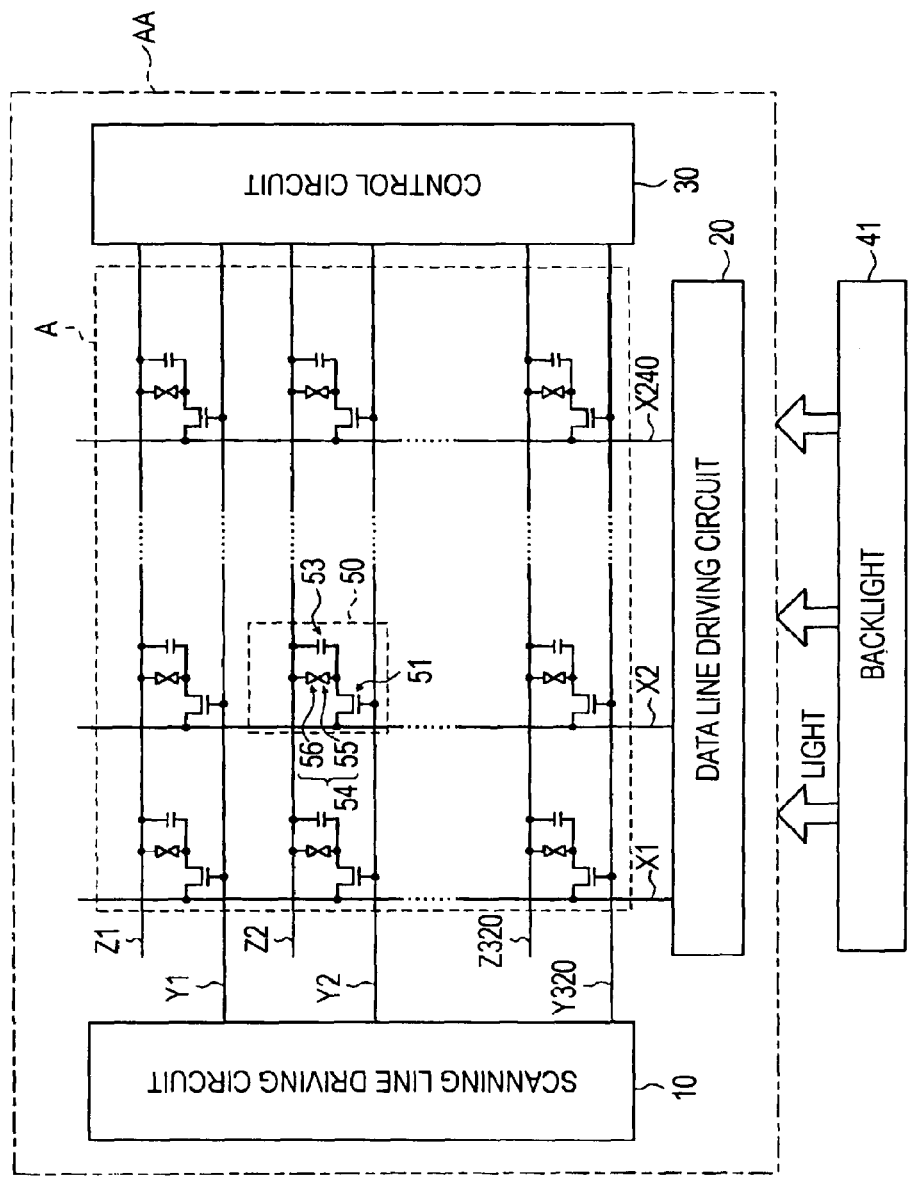
FIG. 1 is a block diagram illustrating a liquid crystal device according to a first embodiment of the invention.

FIG. 1 is a block diagram illustrating a liquid crystal device 1 according to a first embodiment of the invention.

The liquid crystal device 1 includes a liquid crystal panel AA and a backlight 41 that is disposed opposite the liquid crystal panel AA in order to emit light. The liquid crystal device 1 performs transmissive display using light emitted from the backlight 41.

The liquid crystal panel AA is configured to include: a display area A having a plurality of pixels 50; and a scanning line driving circuit 10, a data line driving circuit 20, and a control circuit 30 that are provided in the vicinity of the display area A in order to drive the pixels 50.

The backlight 41 is provided in a bottom surface of the liquid crystal panel AA. In addition, the backlight 41 is formed using, for example, a cold cathode fluorescent tube (CCFL), an LED (light-emitting diode), or an electroluminescent (EL) device and supplies light to the pixels 50 of the liquid crystal panel AA.

Hereinafter, the configuration of the liquid crystal panel AA will be described in detail.

The liquid crystal panel AA includes: 320 rows of scanning lines Y1 to Y320 and 320 rows of common lines Z1 to z320 provided alternately with predetermined gaps therebetween; and 240 rows of data lines X1 to X240 provided to cross the scanning lines Y1 to Y320 and the common lines z1 to z320. Each of the pixels 50 is provided at an intersection of each scanning line Y and each data line X.

Each pixel 50 is configured to include a TFT 51, a pixel electrode 55, a common electrode 56 provided opposite the pixel electrode 55, and a storage capacitor 53 having one electrode connected to the common line Z and another electrode connected to the pixel electrode 55. The pixel electrode 55 and the common electrode 56 form a pixel capacitor 54.

The common electrode 56 is provided separately for every horizontal line corresponding to the scanning line Y. Each of the plurality of common electrodes 56 provided separately for every horizontal line is connected to the corresponding common line Z.

The scanning line Y is connected to a gate of the TFT 51, the data line X is connected to a source of the TFT 51, and the pixel electrode 55 and the other electrode of the storage capacitor 53 are connected to a drain of the TFT 51. Therefore, when a selection voltage is applied from the scanning line Y, the TFT 51 is turned on, such that the data line X, the pixel electrode 55, and the other electrode of the storage capacitor 53 become electrically conductive.

Figure 2:
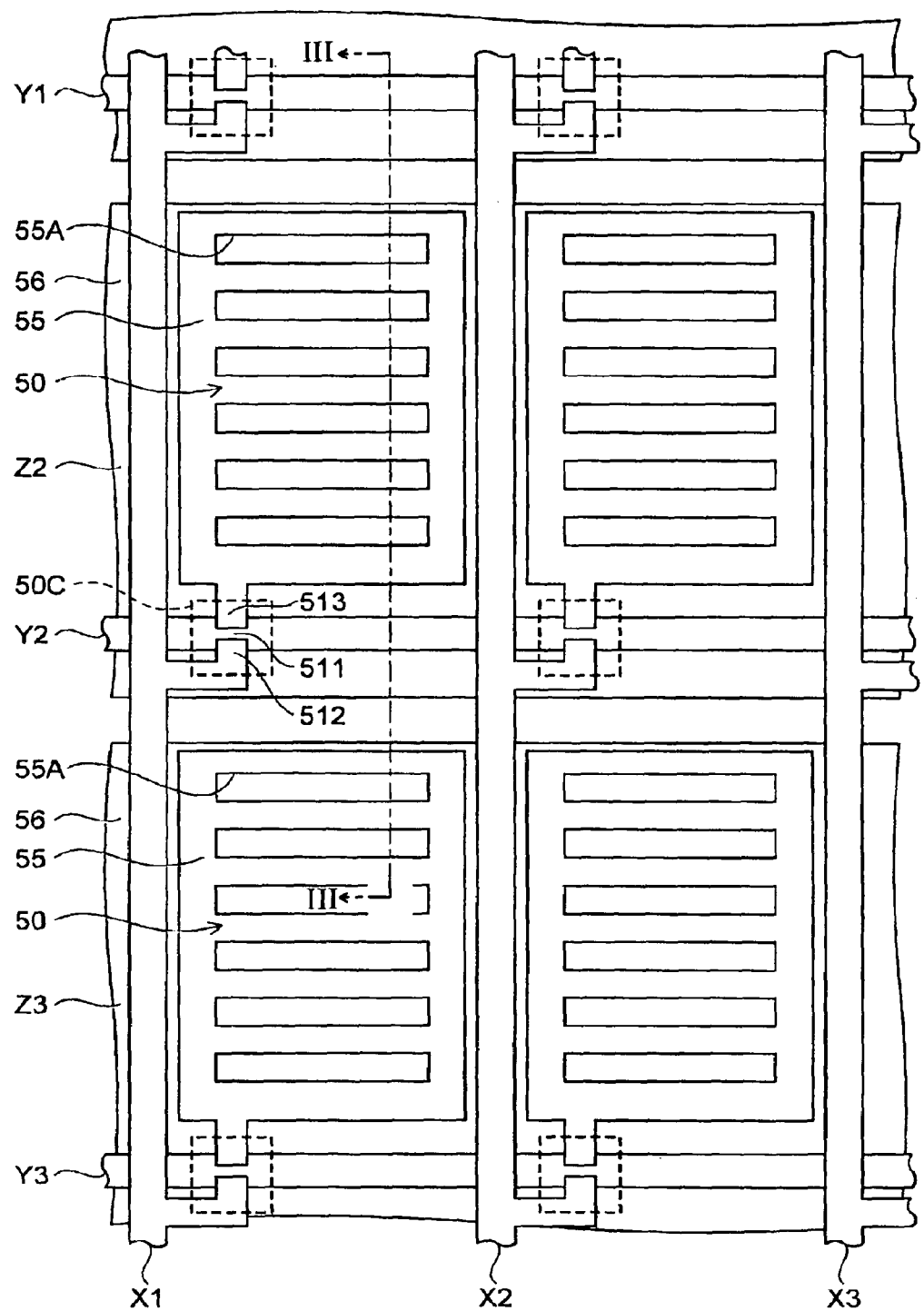
FIG. 2 is an enlarged plan view illustrating a pixel provided in the liquid crystal device.
Figure 3:
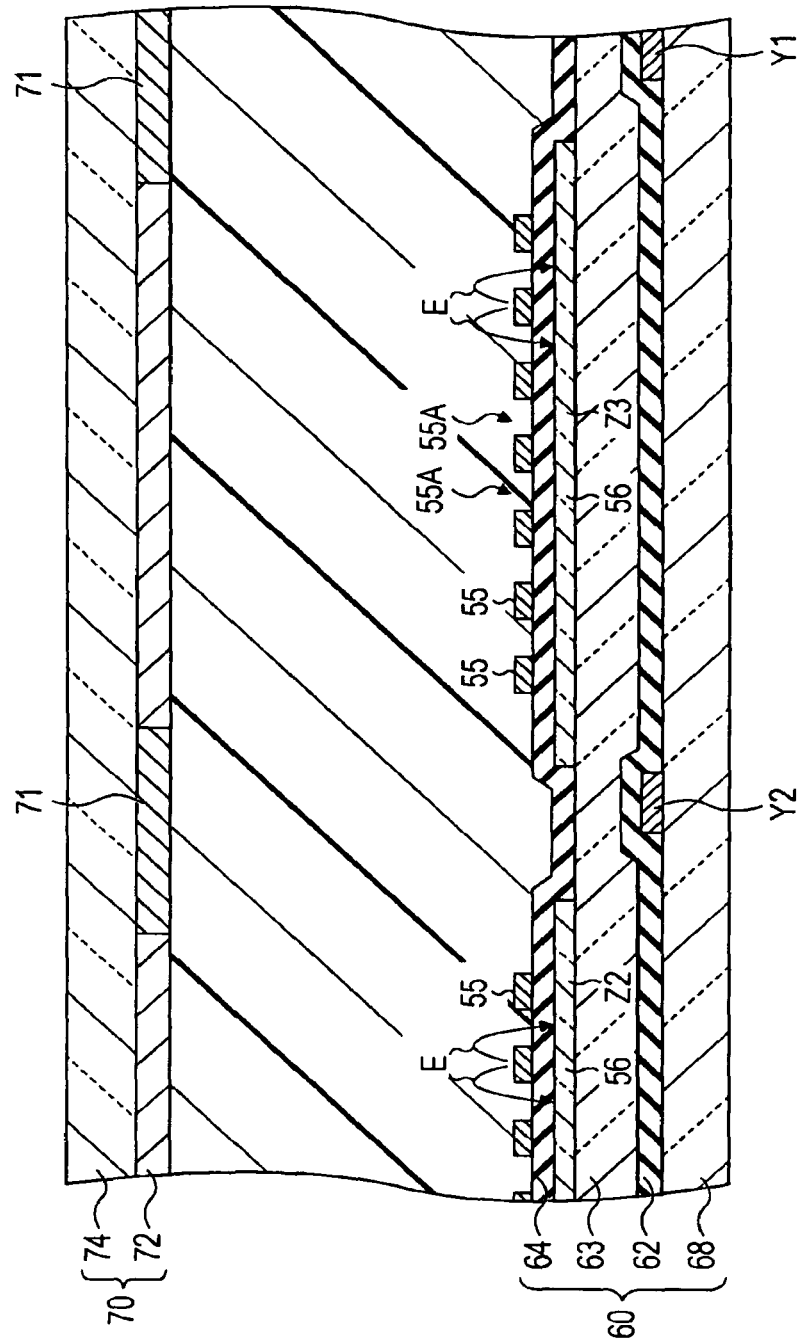
FIG. 3 is a cross-sectional view illustrating the pixel provided in the liquid crystal device.

FIG. 2 is an enlarged plan view illustrating the pixels 50. FIG. 3 is a cross-sectional view of one of the pixels 50 taken along the line III-III of FIG. 2.

As shown in FIG. 3, the liquid crystal panel AA includes an element substrate 60 having the plurality of pixel electrodes 55, a counter substrate 70 disposed opposite the element substrate 60, and liquid crystal provided between the element substrate 60 and the counter substrate 70.

As shown in FIG. 2, in the element substrate 60, each pixel 50 is a region surrounded by two scanning lines Y that are adjacent to each other and are made of a conductive material and two data lines X that are adjacent to each other and are made of a conductive material. That is, each pixel 50 is partitioned by the scanning lines Y and data lines X.

In the present embodiment, the TFT 51 is a reverse stagger type amorphous silicon TFT, and a region 50C (portion surrounded by a dotted line in FIG. 2) in which the TFT 51 is formed is positioned near the intersection of the scanning line Y and data line X.

First, the element substrate 60 will be described.

The element substrate 60 has a glass substrate 68. On the glass substrate 68, a base insulating layer (not shown) is formed over the entire surface of the element substrate 60 in order to prevent variation in characteristics of the TFT 51 from occurring due to surface roughness and contamination of the glass substrate 68.

On the base insulating layer, the scanning line Y made of a conductive material is formed.

The scanning line Y is provided along the boundary between the adjacent pixels 50 and forms a gate electrode 511 of the TFT 51 in the vicinity of an intersection of the scanning line Y and the data line X.

On the scanning line Y, the gate electrode 511, and the base insulating layer, a gate insulating layer 62 is formed over the entire surface of the element substrate 60.

On the region 50C on the gate insulating layer 62 where the TFT 51 is formed, a semiconductor layer (not shown) made of amorphous silicon and an ohmic contact layer (not shown) made of $N^+$ amorphous silicon are laminated opposite the gate electrode 511. A source electrode 512 and a drain electrode 513 are laminated on the ohmic contact layer, such that an amorphous silicon TFT is formed.

The source electrode 512 is formed of the same conductive material as the data line X. That is, the source electrode 512 protrudes from the data line X. The data line x is provided to cross the scanning line Y and the common line Z.

As described above, the gate insulating layer 62 is formed on the scanning line Y and the data line x is formed on the gate insulating layer 62. Accordingly, the data line X is insulated from the scanning line Y due to the gate insulating layer 62.

On the data line X, the source electrode 512, the drain electrode 513, and the gate insulating layer 62, an insulating layer 63 serving as a planarizing layer is formed over the entire surface of the element substrate 60. The insulating layer 63 may be formed of an acrylic resin, for example.

On the insulating layer 63, the common line Z made of a transparent conductive material, such as ITO (indium tin oxide), is formed. The common line Z is formed along the scanning line Y. In addition, the common line Z is integrally formed with the common electrode 56 that is provided for all horizontal lines.

On the common line Z, the common electrode 56, and the insulating layer 63, an insulating layer 64 is formed over the entire surface of the element substrate 60. A transparent inorganic insulating layer made of $SiO_2$, $SiN_x$, or the like may be used as the insulating layer 63, and the thickness of the insulating layer 63 is adjusted according to the required auxiliary capacity. For example, the insulating layer 63 is formed to have a thickness of 50 nm to 400 nm in the case of fineness of 200 ppi or more and to have a thickness of 200 nm to 1000 nm in the case of fineness less than 200 ppi.

On the insulating layer 64, the pixel electrode 55 made of a transparent conductive material, such as ITO (indium tin oxide), is formed in a region opposite to the common electrode 56. The pixel electrode 55 is connected to the drain electrode 513 through contact holes (not shown) formed in the insulating layer 63, the insulating layer 64, and the common electrode 56.

A plurality of slits 55A for generating a fringe field (electric field E) between the pixel electrodes 55 and the common electrode 56 are provided at predetermined gaps between the pixel electrodes 55. That is, liquid crystal in the liquid crystal device 1 operates in the FFS mode.

On the pixel electrode 55 and the second insulating layer 64, an alignment layer (not shown) that is an organic layer, such as a polyimide layer, is formed over the entire surface of the element substrate 60.

Next, the counter substrate 70 will be described.

The counter substrate 70 has a glass substrate 74. At a position on the glass substrate 74 opposite the scanning line Y, a light shielding layer 71 as a black matrix is formed. In addition, a color filter 72 is formed in a region on the glass substrate 74 excluding a region where the light shielding layer 71 is formed.

On the light shielding layer 71 and the color filter 72, an alignment layer (not shown) is formed over the entire surface of the counter substrate 70.

Referring back to FIG. 1, the scanning line driving circuit 10 supplies a selection voltage, which causes the TFTs 51 to be turned on, to the plurality of scanning lines Y in a sequential manner. For example, when the selection voltage is supplied to a predetermined scanning line Y, all TFTs 51 connected to the scanning line Y are turned on. Accordingly, all pixels 50 related to the scanning line Y are selected.

The data line driving circuit 20 supplies an image signal to the data line X and writes an image voltage based on the image signal into the pixel electrode 55 through the TFT 51 that is in the ON state.

In this case, the data line driving circuit 20 alternately performs positive-polarity writing and negative-polarity writing for every horizontal line. Specifically, the data line driving circuit 20 supplies a positive-polarity image signal, of which an electric potential is higher than a voltage of the common electrode 56, to the data line X so as to write an image voltage based on the positive-polarity image signal into the pixel electrode 55 (positive-polarity writing) and supplies a negative-polarity image signal, of which an electric potential is lower than the voltage of the common electrode 56, to the data line X so as to write an image voltage based on the negative-polarity image signal into the pixel electrode 55 (negative-polarity writing) in an alternate manner for every horizontal line.

The control circuit 30 alternately supplies a voltage VCOML serving as a first voltage and a voltage VCOMH, which is higher than the voltage VCOML and serves as a second voltage, to the common line Z.

The liquid crystal device 1 described above operates as follows.

That is, first, either the voltage VCOML or the voltage VCOMH is selectively supplied from the control circuit 30 to the common line Z.

Specifically, the voltage VCOML and the voltage VCOMH are alternately supplied to each common line Z for every frame period. For example, in the case when the voltage VCOML is supplied to a p-th row common line Zp (where p is an integer satisfying $1 \leq p \leq 320$) for a predetermined one frame period, the voltage VCOMH is supplied to the common line Zp for a next one frame period. On the other hand, in the case when the voltage VCOMH is supplied to the common line Zp for a predetermined one frame period, the voltage VCOML is supplied to the common line Zp for a next one frame period.

In addition, different voltages are supplied to the adjacent common lines Z. For example, in the case when the voltage VCOML is supplied to the common line Zp for a predetermined one frame period, the voltage VCOMH is supplied to a (p−1)-th row common line Z(p−1) and a (p+1)-th row common line Z(p+1) for the same one frame period. On the other hand, in the case when the voltage VCOMH is supplied to the common line Zp for a predetermined one frame period, the voltage VCOML is supplied to the common line Z(p−1) and the common line Z(p+1) for the same one frame period.

Then, the scanning line driving circuit 10 sequentially supplies the selection voltage to 320 rows of scanning lines Y1 to Y320 to sequentially turn on all of the TFTs 51 connected to each scanning line Y, such that all pixels 50 related to each scanning line Y are sequentially selected.

Next, in synchronization with the selection of the pixels 50, the data line driving circuit 20 alternately supplies the positive-polarity image signal and the negative-polarity image signal to the data line X for every horizontal line corresponding to a voltage of the common electrode 56. Specifically, in the case when the voltage VCOML is supplied to the common line Zp related to the selected pixel 50 among the 320 rows of common lines Z1 to Z320, the positive-polarity image signal is supplied to the data line X. On the other hand, in the case when the voltage VCOMH is supplied to the common line Zp related to the selected pixel 50 among the 320 rows of common lines z1 to Z320, the negative-polarity image signal is supplied to the data line X.

Then, an image signal is supplied from the data line driving circuit 20 to all pixels 50 selected by the scanning line driving circuit 10 through the data line X and the TFTs 51 that are in the ON state, such that an image voltage based on the image signal is written into the pixel electrodes 55. Thus, a potential difference occurs between the pixel electrode 55 and the common electrode 56, and accordingly, a driving voltage is applied to liquid crystal.

When a driving voltage is applied to liquid crystal, the alignment or ordering of molecules of the liquid crystal changes. As a result, light that is emitted from the backlight 41 and is transmitted through the liquid crystal changes. When the changed light is transmitted through color filters, gray-scale display is performed. In addition, due to the storage capacitor 53, the driving voltage applied to liquid crystal is retained for a period of time that is three orders of magnitude longer than a period of time for which the image voltage is written.

Figure 4:
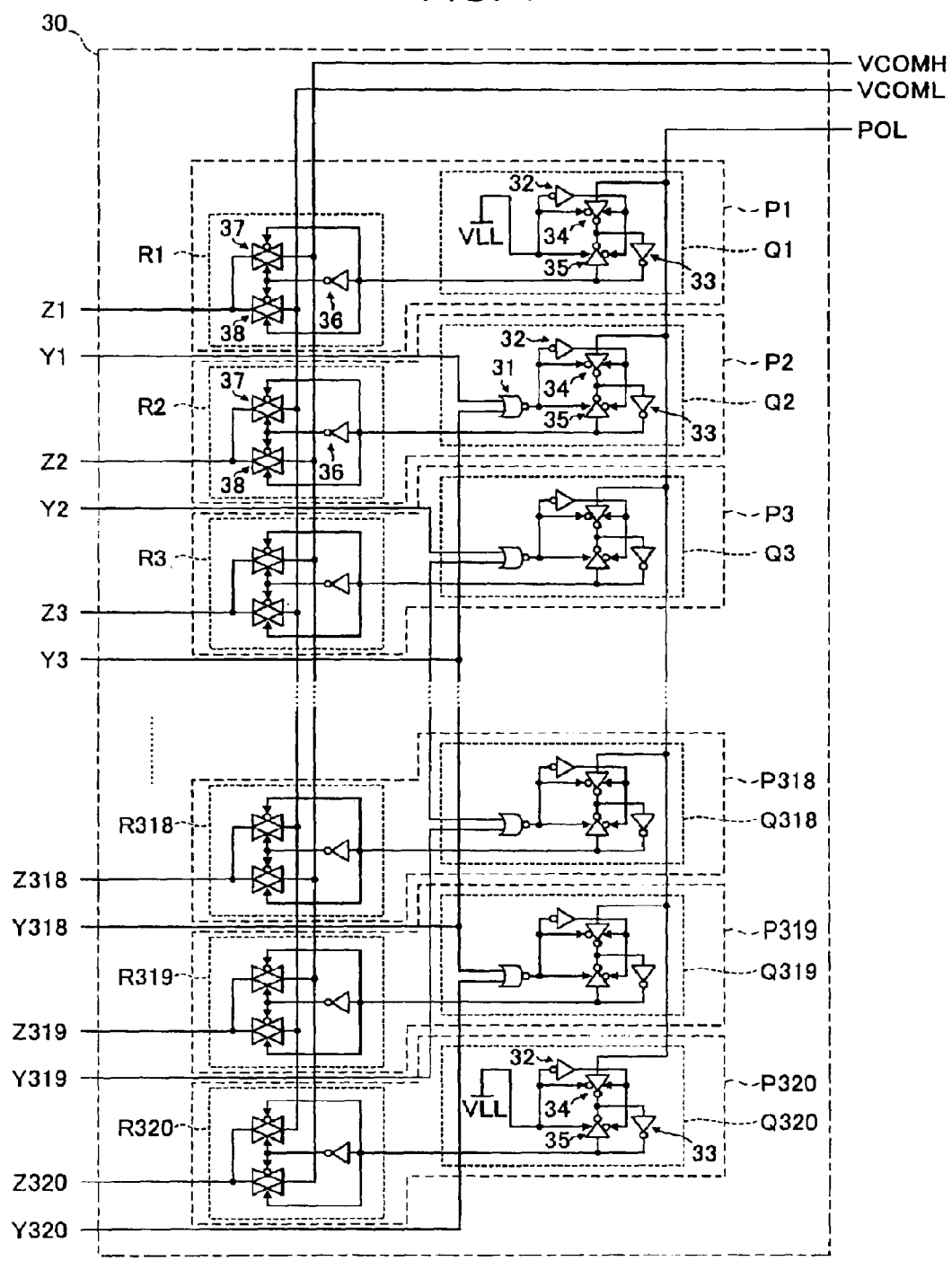
FIG. 4 is a block diagram illustrating a control circuit provided in the liquid crystal device.

FIG. 4 is a block diagram illustrating the control circuit 30.

The control circuit 30 includes 320 unit control circuits PI to P320 corresponding to the 320 rows of scanning lines Y1 to Y320. The voltage VCOML, the voltage VCOMH, and a polar signal POL for selecting either the voltage VCOML or the voltage VCOMH are supplied to each unit control circuit P.

The unit control circuit P includes a latch circuit Q that holds the polar signal POL and a selection circuit R that selectively outputs either the voltage VCOML or the voltage VCOMH according to the polar signal POL.

The latch circuit Q may be largely divided into two types according to a method of holding the polar signal POL. A latch circuit Q1 provided in correspondence with the first row scanning line Y1 and a latch circuit Q320 provided in correspondence with the 320-th row scanning line Y320 correspond to one of the two types. Latch circuits Q2 to Q319 excluding the latch circuits Q1 and Q320 correspond to the other type.

First, the latch circuits Q2 to Q319 will be described.

A latch circuit Qq (where q is an integer satisfying $2 \leq q \leq 319$) provided corresponding to a q-th row scanning line Yq includes a NOT-OR operation circuit (hereinafter, referred to as 'NOR circuit') 31, a first inverter 32, a second inverter 33, a first clocked inverter 34, and a second clocked inverter 35.

A (q−1)-th scanning line Y(q−1) and a (q+1)-th scanning line Y(q+1) are connected to two input terminals of the NOR circuit 31, respectively. An output terminal of the NOR circuit 31 is connected with an input terminal of the first inverter 32, an inverting input control terminal of the first clocked inverter 34, and a non-inverting input control terminal of the second clocked inverter 35.

An output terminal of the first inverter 32 is connected with a non-inverting input control terminal of the first clocked inverter 34 and an inverting input control terminal of the second clocked inverter 35.

The polar signal POL is input to an input terminal of the first clocked inverter 34. An output terminal of the first clocked inverter 34 is connected with an input terminal of the second inverter 33.

An input terminal of the second clocked inverter 35 is connected with an output terminal of the second inverter 33, and an output terminal of the second clocked inverter 35 is connected with an input terminal of the second inverter 33.

The latch circuit Qq described above operates as follows.

That is, when a selection voltage is supplied to at least one of the scanning line Y(q−1) and the scanning line Y(p+1), the NOR circuit 31 included in the latch circuit Qq outputs an L-level signal. The L-level signal is input to the inverting input control terminal of the first clocked inverter 34, and at the same time, the L-level signal is inverted by the first inverter 32 and is then input as an H-level signal to a non-inverting input terminal of the first clocked inverter 34. Then, the first clocked inverter 34 is turned on to invert the polar signal POL and output the inverted polar signal POL. The polar signal POL that is inverted and output from the first clocked inverter 34 is inverted by the second inverter 33 and is then output from the second inverter 33.

As described above, when a selection voltage is supplied to at least one of the scanning line Y(q−1) and the scanning line Y(p+1) from the scanning line driving circuit, the latch circuit Qp receives the polar signal POL.

On the other hand, when a selection voltage is not supplied to the scanning line Y(q−1) and the scanning line Y(p+1), the NOR circuit 31 included in the latch circuit Qq outputs an H-level signal. The H-level signal is input to the non-inverting input control terminal of the second clocked inverter 35, and at the same time, the H-level signal is inverted by the first inverter 32 and is then input as an L-level signal to an inverting input terminal of the second clocked inverter 35. Then, the second clocked inverter 35 is turned on to invert the polar signal POL, which is output from the second inverter 33, and output the inverted polar signal POL. The polar signal POL that is inverted and output from the second clocked inverter 35 is input again to the second inverter 33.

As described above, when a selection voltage is not supplied to the scanning line Y(q−1) and the scanning line Y(p+1) from the scanning line driving circuit, the latch circuit Qp holds the polar signal POL, which has been already received, through the second inverter 33 and the second clocked inverter 35.

Next, the latch circuits Q1 and Q320 will be described.

As compared with the latch circuit Qq described above, each of the latch circuits Q1 and Q320 includes a low-potential power source VLL that outputs an L-level signal instead of the NOR circuit 31. The others are the same as the configuration of the latch circuit Qq described above.

The latch circits Q1 and Q320 operate as follows.

That is, an L-level signal is always output from the low-potential power source VLL. The L-level signal is input to the inverting input control terminal of the first clocked inverter 34, and at the same time, the L-level signal is inverted by the first inverter 32 and is then input as an H-level signal to the non-inverting input control terminal of the first clocked inverter 34. Accordingly, the first clocked inverter 34 is always in the ON state, such that the first clocked inverter 34 inverts the polar signal POL all the time and outputs the inverted polar signal POL. The polar signal POL that is inverted and output from the first clocked inverter 34 is inverted by the second inverter 33 and is then output from the second inverter 33. As described above, the latch circuits Q1 and Q320 always receives the polar signal POL.

The selection circuit R includes an inverter 36, a first transfer gate 37, and a second transfer gate 38.

An input terminal of the inverter 36 is connected with an output terminal of the second inverter 33 included in the latch circuit Q, and an output terminal of the inverter 36 is connected with a non-inverting input control terminal of the first transfer gate 37 and an inverting input control terminal of the second transfer gate 38.

An inverting input control terminal of the first transfer gate 37 is connected with an output terminal of the second inverter 33 included in the latch circuit Q, and an output terminal of the first transfer gate 37 is connected with the common line Z.

In addition, the voltage VCOMH is input to an input terminal of the first transfer gate 37 included in the selection circuit R provided corresponding to the odd row scanning line Y.

On the other hand, the voltage VCOML is input to an input terminal of the first transfer gate 37 included in the selection circuit R provided corresponding to the even row scanning line Y.

A non-inverting input control terminal of the second transfer gate 38 is connected with the output terminal of the second inverter 33 included in the latch circuit Q, and an output terminal of the second transfer gate 38 is connected with the common line Z. In addition, the voltage VCOML is input to an input terminal of the second transfer gate 38 included in the selection circuit R provided corresponding to the odd row scanning line Y. On the other hand, the voltage VCOMH is input to an input terminal of the second transfer gate 38 included in the selection circuit R provided corresponding to the even row scanning line Y.

The selection circuit R described above operates as follows.

That is, when the L-level polar signal POL is output from the second inverter 33 included in the latch circuit Q, the L-level polar signal POL is input to the inverting input control terminal of the first transfer gate 37, and at the same time, the L-level polar signal POL is inverted by the inverter 36 and is then input as the H-level polar signal POL to the non-inverting input control terminal of the first transfer gate 37. Accordingly, the first transfer gate 37 is turned on.

In the case when the first transfer gate 37 that is turned on is included in the selection circuit R provided corresponding to the odd row scanning line Y, the voltage VCOMH is output to the common line Z. On the other hand, in the case when the first transfer gate 37 that is turned on is included in the selection circuit R provided corresponding to the even row scanning line Y, the voltage VCOML is output to the common line Z.

On the other hand, when the H-level polar signal POL is output from the second inverter 33 included in the latch circuit Q, the H-level polar signal POL is input to the non-inverting input control terminal of the second transfer gate 38, and at the same time, the H-level polar signal POL is inverted by the inverter 36 and is then input as the L-level polar signal POL to the inverting input control terminal of the second transfer gate 38. Accordingly, the second transfer gate 38 is turned on.

In the case when the second transfer gate 38 that is turned on is included in the selection circuit R provided corresponding to the odd row scanning line Y, the voltage VCOML is output to the common line Z. On the other hand, in the case when the second transfer gate 38 that is turned on is included in the selection circuit R provided corresponding to the even row scanning line Y, the voltage VCOMH is output to the common line Z.

Next, an operation of the control circuit 30 including the latch circuit Q and the selection circuit R will be described with reference to FIG. 5.

Figure 5:
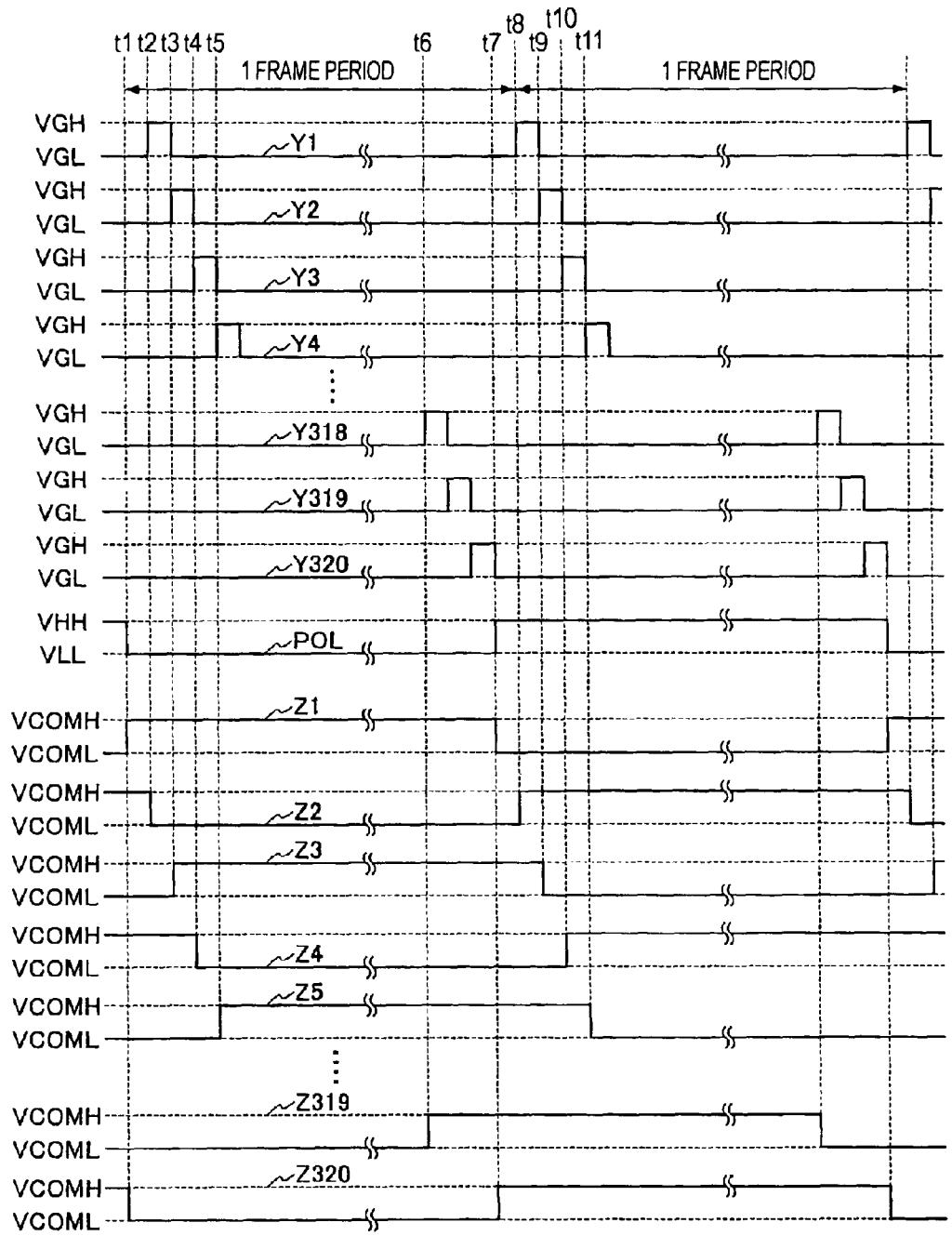
FIG. 5 illustrates a timing chart of the control circuit provided in the liquid crystal device.

FIG. 5 illustrates a timing chart of the control circuit 30.

First, at time t1, the polar signal POL is set as a voltage VLL, such that the polar signal POL has an 'L' level. Then, the unit control circuits P1 and P320 receive the L-level polar signal POL through the latch circuits Q1 and Q320 that always receive the polar signal POL and output the voltage VCOMH and the voltage VCOML through the selection circuit R1 and R320, respectively. Accordingly, the common line Z1 connected to the unit control circuit P1 has the voltage VCOMH, and the common line Z320 connected to the unit control circuit P320 has the voltage VCOML. In addition, a voltage VGH is 8 V and a voltage VGL is −1 V.

Then, at time t2, a selection voltage is supplied from the scanning line driving circuit 10 to a first row scanning line Y1, such that a voltage of the scanning line Y1 changes to the voltage VGH. Then, the unit control circuit P2 provided corresponding to a scanning line Y2 adjacent to the scanning line Y1 receives the L-level polar signal POL through the latch circuit Q2 and outputs the voltage VCOML through the selection circuit R2. Accordingly, the common line Z2 connected to the unit control circuit P2 has the voltage VCOML.

Then, at time t3, the scanning line driving circuit 10 stops supplying the selection voltage to the scanning line Y1, such that a voltage of the scanning line Y1 changes to the voltage VGL. At the same time, the selection voltage is supplied from the scanning line driving circuit 10 to the second row scanning line Y2, such that a voltage of the scanning line Y2 changes to the voltage VGH. Then, the unit control circuit P3 provided corresponding to a scanning line Y3 adjacent to the scanning line Y2 receives the L-level polar signal POL through the latch circuit Q3 and outputs the voltage VCOMH through the selection circuit R3. Accordingly, the common line Z3 connected to the unit control circuit P3 has the voltage VCOMH.

Then, at time t4, the scanning line driving circuit 10 stops supplying the selection voltage to the scanning line Y2, such that a voltage of the scanning line Y2 changes to the voltage VGL. At the same time, the selection voltage is supplied from the scanning line driving circuit 10 to the third row scanning line Y3, such that a voltage of the scanning line Y3 changes to the voltage VGH. Then, the unit control circuit P4 provided corresponding to a scanning line Y4 adjacent to the scanning line Y3 receives the L-level polar signal POL through the latch circuit Q4 and outputs the voltage VCOML through the selection circuit R4. Accordingly, the common line Z4 connected to the unit control circuit P4 has the voltage VCOML. In addition, the unit control circuit P2 provided corresponding to the scanning line Y2 adjacent to the scanning line Y3 receives the L-level polar signal POL through the latch circuit Q2 and outputs the voltage VCOML through the selection circuit R2. Accordingly, the common line Z2 connected to the unit control circuit P2 has the voltage VCOML.

Then, at time t5, the scanning line driving circuit 10 stops supplying the selection voltage to the scanning line Y3, such that a voltage of the scanning line Y3 changes to the voltage VGL. At the same time, the selection voltage is supplied from the scanning line driving circuit 10 to the fourth row scanning line Y4, such that a voltage of the scanning line Y4 changes to the voltage VGH. Then, the unit control circuit P5 provided corresponding to a scanning line Y5 adjacent to the scanning line Y4 receives the L-level polar signal POL through the latch circuit Q5 and outputs the voltage VCOMH through the selection circuit R5. Accordingly, the common line Z5 connected to the unit control circuit P5 has the voltage VCOMH. In addition, the unit control circuit P3 provided corresponding to the scanning line Y3 adjacent to the scanning line Y4 receives the L-level polar signal POL through the latch circuit Q3 and outputs the voltage VCOMH through the selection circuit R3. Accordingly, the common line Z3 connected to the unit control circuit P3 has the voltage VCOMH.

Subsequently, when the selection voltage is supplied from the scanning line driving circuit 10 to the odd row scanning line Y (excluding the first row scanning line Y1), an operation described above at time t4 is performed. In addition, when the selection voltage is supplied from the scanning line driving circuit 10 to the even row scanning line Y (excluding the 320-th row scanning line Y320), an operation described above at time t5 is performed.

Then, at time t7, the scanning line driving circuit 10 stops supplying the selection voltage to the 320-th row scanning line Y320, such that a voltage of the scanning line Y320 changes to the voltage VGL. At the same time, the polar signal POL changes to have a voltage VHH, such that the polar signal POL has an 'H' level. Then, the unit control circuits P1 and P320 receive the H-level polar signal POL through the latch circuits Q1 and Q320 that always receive the polar signal POL and output the voltage VCOML and the voltage VCOMH through the selection circuit R1 and R320, respectively. Accordingly, the common line Z1 connected to the unit control circuit P1 has voltage VCOML, and the common line Z320 connected to the unit control circuit P320 has the voltage VCOMH.

Then, at time t8, the selection voltage is supplied from the scanning line driving circuit 10 to the first row scanning line Y1, such that the voltage of the scanning line Y1 changes to the voltage VGH, in the same manner as at time t2. Then, the unit control circuit P2 outputs the voltage VCOMH, and accordingly, the common line Z2 connected to the unit control circuit P2 has the voltage VCOMH.

Then, at time t9, the scanning line driving circuit 10 stops supplying the selection voltage the scanning line Y1, such that the voltage of the scanning line Y1 changes to the voltage VGL, in the same manner as at time t3. At the same time, the selection voltage is supplied from the scanning line driving circuit 10 to the scanning line Y2, such that the voltage of the scanning line Y2 changes to the voltage VGH, in the same manner as at time t3. Then, the unit control circuit P3 outputs the voltage VCOML, and accordingly, the common line Z3 connected to the unit control circuit P3 has the voltage VCOML.

Then, at time t10, the scanning line driving circuit 10 stops supplying the selection voltage the scanning line Y2, such that the voltage of the scanning line Y2 changes to the voltage VGL, in the same manner as at time t4. At the same time, the selection voltage is supplied from the scanning line driving circuit 10 to the scanning line Y3, such that the voltage of the scanning line Y3 changes to the voltage VGH, in the same manner as at time t4. Then, the unit control circuit P4 outputs the voltage VCOMH, and accordingly, the common line Z4 connected to the unit control circuit P4 has the voltage VCOMH.

In addition, the unit control circuit P2 outputs the voltage VCOMH, and accordingly, the common line Z2 connected to the unit control circuit P2 has the voltage VCOMH, in the same manner as at time t4.

Then, at time t11, the scanning line driving circuit 10 stops supplying the selection voltage the scanning line Y3, such that the voltage of the scanning line Y3 changes to the voltage VGL, in the same manner as at time t5. At the same time, the selection voltage is supplied from the scanning line driving circuit 10 to the scanning line Y4, such that the voltage of the scanning line Y4 changes to the voltage VGH, in the same manner as at time t5. Then, the unit control circuit P5 outputs the voltage VCOML, and accordingly, the common line Z5 connected to the unit control circuit PS has the voltage VCOML. In addition, the unit control circuit P3 outputs the voltage VCOML, and accordingly, the common line Z3 connected to the unit control circuit P3 has the voltage VCOML, in the same manner as at time t5.

Subsequently, when the selection voltage is supplied from the scanning line driving circuit 10 to the odd row scanning line Y (excluding the scanning line Y1), an operation described above at time t10 is performed. In addition, when the selection voltage is supplied from the scanning line driving circuit 10 to the even row scanning line Y (excluding the scanning line Y320), an operation described above at time t11 is performed.

Hereinafter, an operation of the liquid crystal device 1 having the above control circuit 30 will be described with reference to FIGS. 6 and 7.

Figure 6:
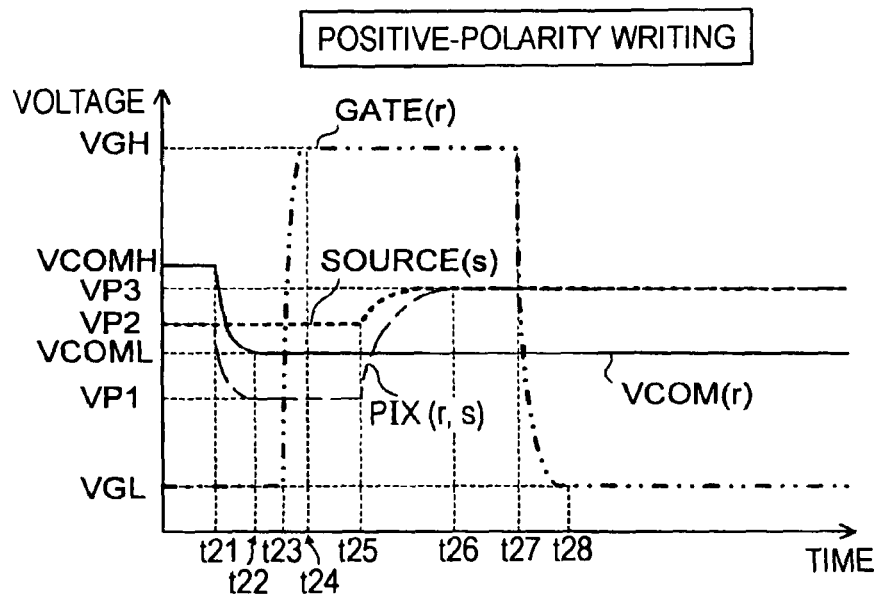
FIG. 6 is a timing chart illustrating the positive-polarity writing of the liquid crystal device.
Figure 7:
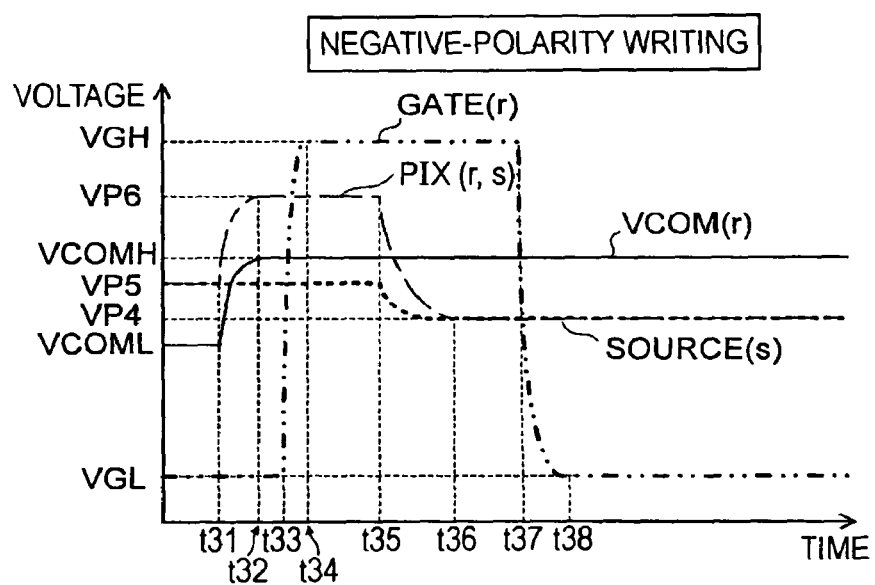
FIG. 7 is a timing chart illustrating the negative-polarity writing of the liquid crystal device.

FIG. 6 is a timing chart illustrating the positive-polarity writing of the liquid crystal device 1. FIG. 7 is a timing chart illustrating the negative-polarity writing of the liquid crystal device 1. In FIGS. 6 and 7, GATE(r) indicates a voltage of an r-th (where, 'r' is an integer satisfying $1 \leq r \leq 320$) row scanning line of 320 rows of scanning lines, and SOURCE(s) indicates a voltage of an s-th (where, 's' is an integer satisfying $1 \leq s \leq 240$) column data line Xs of 240 columns of data lines X. In addition, PIX(r,s) indicates a voltage of the pixel electrode 55 included in the pixel 50, which corresponds to an r-th row and an s-th column, provided at an intersection of an r-th row scanning line Yr and an s-th column data line Xs. In addition, VCOM(r) indicates a voltage of the common electrode 56 connected to an r-th row common line Zr.

First, the positive-polarity writing of the liquid crystal device 1 will be described with reference to FIG. 6.

At time t21, the control circuit 30 supplies the voltage VCOML to the common line Zr. Accordingly, a voltage VCOM(r) of the common electrode 56 connected to the common line Zr drops gradually and then reaches the voltage VCOML at time t22.

As the voltage VCOM(r) of the common electrode 56 connected to the common line Zr drops, the voltage PIX(r,s) of the pixel electrode 55 provided in the pixel 50 corresponding to the r-th row and the s-th column drops such that a potential difference between the voltage VCOM(r) and the voltage PIX(r,s) is maintained. Then, the voltage PIX(r,s) of the pixel electrode 55 provided in the pixel 50 corresponding to the r-th row and the s-th column drops gradually and then reaches a voltage VP1 at time t22.

At time t23, the scanning line driving circuit 10 supplies the selection voltage to the scanning line Yr. Then, the voltage GATE(r) of the scanning line Yr rises and then reaches a voltage VGH at time t24. As a result, all TFTs 51 connected to the scanning line Yr are turned on.

At time t25, the data line driving circuit 20 supplies a positive-polarity image signal to the data line Xs. Accordingly, the voltage SOURCE(s) of the data line Xs rises gradually and then reaches a voltage VP3 at time t26.

The voltage SOURCE(s) of the data line Xs is written, as an image voltage based on the positive-polarity image signal, into the pixel electrode 55 provided in the pixel 50 corresponding to the r-th row and the s-th column through the TFT 51 that is in the ON state and is connected to the scanning line Yr. Then, the voltage PIX(r,s) of the pixel electrode 55 provided in the pixel 50 corresponding to the r-th row and the s-th column drops gradually and then reaches the voltage VP3, which is at the same potential level as the voltage SOURCE(s) of the data line Xs, at time t26.

At time t27, the scanning line driving circuit 10 stops supplying the selection voltage to the scanning line Yr. Then, the voltage GATE(r) of the scanning line Yr drops and then reaches a voltage VGL at time t28. As a result, all TFTs 51 connected to the scanning line Yr are turned off.

Next, the negative-polarity writing of the liquid crystal device 1 will be described with reference to FIG. 7.

At time t31, the control circuit 30 supplies the voltage VCOMH to the common line Zr. Accordingly, the voltage VCOM(r) of the common electrode 56 connected to the common line Zr rises gradually and then reaches the voltage VCOMH at time t32. As the voltage VCOM(r) of the common electrode 56 connected to the common line Zr rises, the voltage PIX(r,s) of the pixel electrode 55 provided in the pixel 50 corresponding to the r-th row and s-th column rises such that a potential difference between the voltage VCOM(r) and the voltage PIX(r,s) is maintained. Then, the voltage PIX(r,s) of the pixel electrode 55 provided in the pixel 50 corresponding to the r-th row and the s-th column rises gradually and then reaches a voltage VP6 at time t32.

At time t33, the scanning line driving circuit 10 supplies the selection voltage to the scanning line Yr. Then, the voltage GATE(r) of the scanning line Yr rises and then reaches a voltage VGH at time t34. As a result, all TFTs 51 connected to the scanning line Yr are turned on.

At time t35, the data line driving circuit 20 supplies a negative-polarity image signal to the data line Xs. Accordingly, the voltage SOURCE(s) of the data line Xs drops gradually and then reaches a voltage VP4 at time t36.

The voltage SOURCE(s) of the data line Xs is written, as an image voltage based on the negative-polarity image signal, into the pixel electrode 55 provided in the pixel 50 corresponding to the r-th row and the s-th column through the TFT 51 that is in the ON state and is connected to the scanning line Yr. Then, the voltage PIX(r,s) of the pixel electrode 55 provided in the pixel 50 corresponding to the r-th row and the s-th column drops gradually and then reaches the voltage VP4, which is at the same potential level as the voltage SOURCE(s) of the data line Xs, at time t36.

At time t37, the scanning line driving circuit 10 stops supplying the selection voltage to the scanning line Yr. Then, the voltage GATE(r) of the scanning line Yr drops and then reaches a voltage VGL at time t38. As a result, all TFTs 51 connected to the scanning line Yr are turned off.

According to the present embodiment, the following effects are obtained.

(1) After supplying the voltage VCOML to the common line Z to set a voltage of the common electrode 56 to the voltage VCOML, a positive-polarity image signal is supplied to the data line X to write a positive-polarity image voltage into the pixel electrode 55. In addition, after supplying the voltage VCOMH to the common line Z to set the voltage of the common electrode 56 to the voltage VCOMH, a negative-polarity image signal is supplied to the data line x to write a negative-polarity image voltage into the pixel electrode 55. For this reason, unlike the related art, electric charges do not move between the storage capacitor 53 and the pixel capacitor 54. Accordingly, even if variation in characteristics of the storage capacitor 53 occurs, the voltage of the pixel electrode 55 does not vary. As a result, it is possible to suppress the display quality from deteriorating.

(2) The voltage VCOM(r) of the common electrode 56 is varied to the voltage VCOML or the voltage VCOMH. Accordingly, since it is possible to cause the voltage of an electrode of the storage capacitor 53 to vary in the same manner as the common electrode 56, it is possible to integrally form the storage capacitor 53 and the pixel capacitor 54. Thus, the liquid crystal device 1 according to the embodiment of the invention is configured to include the pixel electrode 55 and the common electrode 56, which form the pixel capacitor 54, formed on the element substrate 60 of the element substrate 60 and the counter substrate 70 serving as a pair of substrates having liquid crystal interposed therebetween.

(3) The common electrode 56 is provided separately for every horizontal line. Further, while alternately supplying the voltage VCOML and the voltage VCOMH to the common electrode 56 for every horizontal line, the positive-polarity image signal and the negative-polarity image signal are alternately supplied to each data line X for every horizontal line corresponding to the voltage of the common electrodes 56. Accordingly, by mixing the pixel 50, in which the positive-polarity writing is performed, and the pixel 50, in which the negative-polarity writing is performed, within one frame, it is possible to offset a flicker between these pixels 50. As a result, it is possible to further suppress the display quality from deteriorating.

(4) In the control circuit 30, 320 unit control circuits P1 to P320 are provided corresponding to 320 rows of scanning lines Y1 to Y320 and the latch circuit Q and the selection circuit R are provided in each unit control circuit P. Thus, either the voltage VCOML or the voltage VCOMH can be selectively supplied to the common electrode 56 by the control circuit 30.

(5) When a selection voltage is supplied to the scanning line Y adjacent to the scanning line Y corresponding to the unit control circuit P, the polar signal is held by the latch circuit Q. Accordingly, the polar signal is sequentially held in the plurality of unit control circuits P on the basis of the selection voltage that is sequentially supplied to the plurality of scanning lines Y by the scanning line driving circuit 10. Thus, since the control circuit 30 transmits sequential polar signals to the plurality of unit control circuits P, it is not necessary to provide a sequential transfer circuit called a shift register circuit. As a result, the power consumption can be reduced.

(6) While the polar signal POL is always acquired by the latch circuits Q1 and Q320, the polar signal is acquired by the latch circuit Q2 to Q319 when the selection voltage is supplied to at least one of the two adjacent scanning lines Y. Accordingly, even in a case in which the scanning lines Y1 to Y320 are selected by the scanning line driving circuit 10 in the order of the scanning line Y1 to scanning line Y320 as well as a case in which the scanning lines Y1 to Y320 are selected by the scanning line driving circuit 10 in the order of the scanning line Y320 to scanning line Y1, the control circuit 30 can transmit the sequential polar signals to the plurality of unit control circuits P.

(7) In the related art described above, after varying a voltage of a capacitive line, a voltage for turning off a TFT is set to, for example, −4 V in order to prevent an image voltage written into a pixel electrode from leaking from the TFT that is in the OFF state. Accordingly, assuming that a voltage for turning on the TFT is 8 V, the amplitude of a voltage of the scanning line is 12 V. In contrast, in the present embodiment of the invention, the voltage for turning off the TFT 51 is set to −1 V and the voltage for turning on the TFT 51 is set to 8 V, such that the amplitude of the voltage of the scanning line Y is set to 9 V. Therefore, it is possible to reduce the power consumption and to increase the reliability of TFT 51.

Second Embodiment

Figure 8:
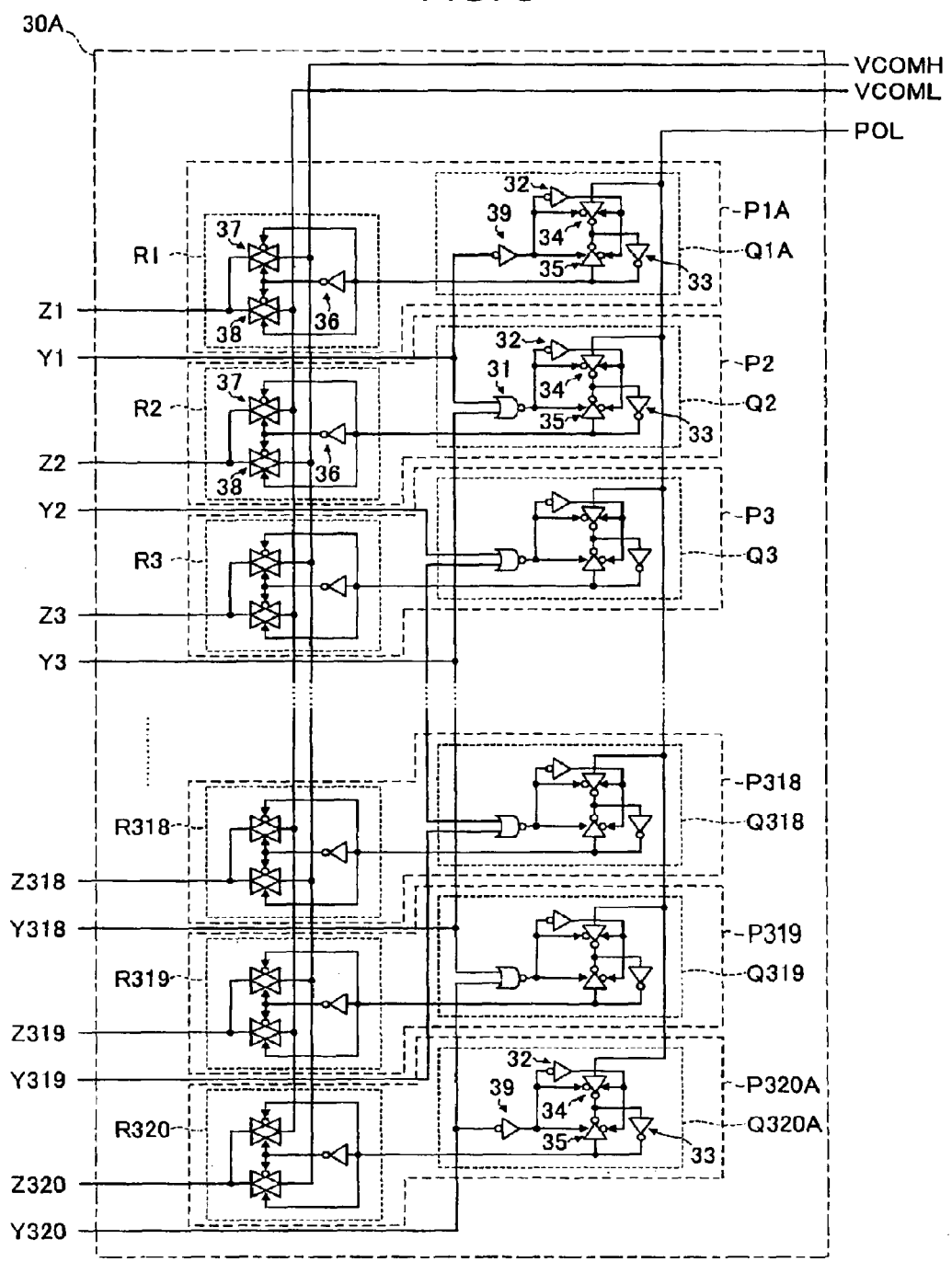
FIG. 8 is a block diagram illustrating a control circuit according to a second embodiment of the invention.

FIG. 8 is a block diagram illustrating a control circuit 30A according to a second embodiment of the invention.

In the present embodiment, the configuration of a latch circuit Q1A provided corresponding to a first row scanning line Y1 and the configuration of a latch circuit Q320A provided corresponding to a 320-th row scanning line Y320 are different from the configurations of the latch circuits Q1 and Q320 in the first embodiment. Since other configurations are the same as those in the first embodiment, an explanation thereof will be omitted.

Each of the latch circuits Q1A and Q320A includes a first inverter 32, a second inverter 33, a first clocked inverter 34, a second clocked inverter 35, and a third inverter 39.

An input terminal of the third inverter 39 included in the latch circuit Q1A is connected with a scanning line Y1 and an input terminal of the third inverter 39 included in the latch circuit Q320A is connected with the scanning line Y320. An output terminal of the third inverter 39 is connected with an input terminal of the first inverter 32, an inverting input control terminal of the first clocked inverter 34, and a non-inverting input control terminal of the second clocked inverter 35.

The latch circuit Q1A operates as follows.

That is, when a selection voltage is supplied to the scanning line Y1, the third inverter 39 provided in the latch circuit Q1A outputs an L-level signal. The L-level signal is input to an inverting input control terminal of the first clocked inverter 34, and at the same time, the L-level signal is inverted by the first inverter 32 and is then input as an H-level signal to a non-inverting input terminal of the first clocked inverter 34. Then, the first clocked inverter 34 is turned on to invert the polar signal POL and output the inverted polar signal POL. The polar signal POL that is inverted and output from the first clocked inverter 34 is inverted by the second inverter 33 and is then output from the second inverter 33.

In addition, when a selection voltage is supplied to the scanning line Y320; the latch circuit Q320A operates in the same manner as the latch circuit Q1A described above.

As described above, when the selection voltage is supplied from the scanning line driving circuit 10 to the scanning line Y1, the latch circuit Q1A receives the polar signal POL. In addition, when the selection voltage is supplied from the scanning line driving circuit 10 to the scanning line Y320, the latch circuit Q320A receives the polar signal POL.

Figure 9:
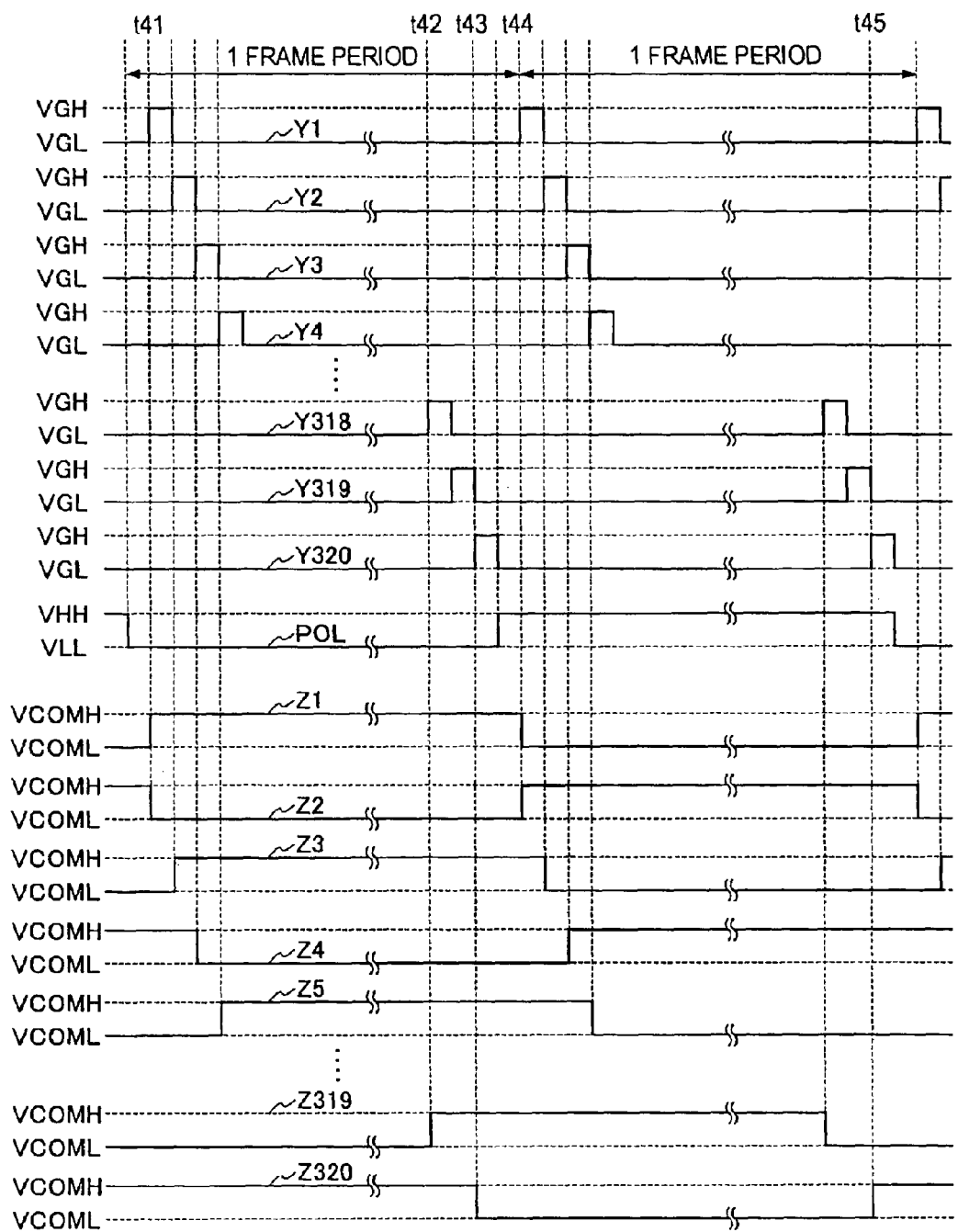
FIG. 9 illustrates a timing chart of the control circuit.

FIG. 9 illustrates a timing chart of the control circuit 30A.

The timing chart of the control circuit 30A shown in FIG. 9 is different from the timing chart of the control circuit 30 according to the first embodiment shown in FIG. 9 in that voltages of the common lines Z1 and Z320 are varied.

A voltage of the common line Z1 is inverted at the same time as the selection voltage is supplied from the scanning line driving circuit 10 to the scanning line Y1.

Specifically, at time t41, the selection voltage is supplied from the scanning line driving circuit 10 to the scanning line Y1, and at the same time, the unit control circuit P1A receives the L-level polar signal POL through the latch circuit Q1A and outputs the voltage VCOMH through the selection circuit R1. As a result, the common line Z1 connected to the unit control circuit P1A has the voltage VCOMH.

Then, at time t44, the selection voltage is supplied from the scanning line driving circuit 10 to the scanning line Y1, and at the same time, the unit control circuit P1A receives the H-level polar signal POL through the latch circuit Q1A and outputs the voltage VCOML through the selection circuit R1. As a result, the common line Z1 connected to the unit control circuit P1A has the voltage VCOML.

In addition, in the same manner as the common line Z1, the polarity of a voltage of the common line Z320 is inverted at the same time as the selection voltage is supplied from the scanning line driving circuit 10 to the scanning line Y320.

Specifically, at time t43, the selection voltage is supplied from the scanning line driving circuit 10 to the scanning line Y320, and at the same time, the unit control circuit P320A receives the L-level polar signal POL through the latch circuit Q320A and outputs the voltage VCOML through the selection circuit R320. As a result, the common line Z320 connected to the unit control circuit P320A has the voltage VCOML.

Then, at time t44, the selection voltage is supplied from the scanning line driving circuit 10 to the scanning line Y320, and at the same time, the unit control circuit P320A receives the H-level polar signal POL through the latch circuit Q320A and outputs the voltage VCOMH through the selection circuit R320. As a result, the common line Z320 connected to the unit control circuit P320A has the voltage VCOMH.

According to the present embodiment, the following effects are obtained.

(8) As shown in FIG. 2, the common electrode 56 is provided separately for every horizontal line. For this reason, voltages of the common electrodes 56 are different for adjacent horizontal lines. Accordingly, there is a case in which an electric field is generated between the common electrodes 56 to slightly change the alignment or ordering of molecules of liquid crystal. Particularly in the first embodiment, as shown in FIG. 5, a voltage of the common line Z319 is the voltage VCOMH and a voltage of the common line Z320 is the voltage VCOML during a period of time t6 to t7. Here, the period of time t6 to t7 is equivalent to three times a period of time in which the scanning line Y is selected by the scanning line driving circuit 10. Accordingly, there has been a case in which an electric field is generated between the common electrode 56 connected to the common line Z319 and the common electrode 56 connected to the common line Z320 during the period of time t6 to t7 such that the alignment or ordering of molecules of liquid crystal greatly varies. For this reason, the polarity of the voltage of the common line Z320 is inverted at the same time as the selection voltage is supplied to the scanning line Y320, such that a period in which the voltage of the common line Z319 and the voltage of the common line Z320 are different corresponds to a period of time t42 to t43. In this case, the period of time t42 to t43 is equivalent to twice a period of time in which the scanning line Y is selected by the scanning line driving circuit 10. Accordingly, the period in which the voltage of the common line Z319 and the voltage of the common line Z320 are different is short as compared with that in the first embodiment. As a result, it is possible to suppress the alignment or ordering of molecules of liquid crystal from changing due to the electric field generated between the common electrode 56 connected to the common line Z319 and the common electrode 56 connected to the common line Z320 as compared with the first embodiment.

Third Embodiment

Figure 10:
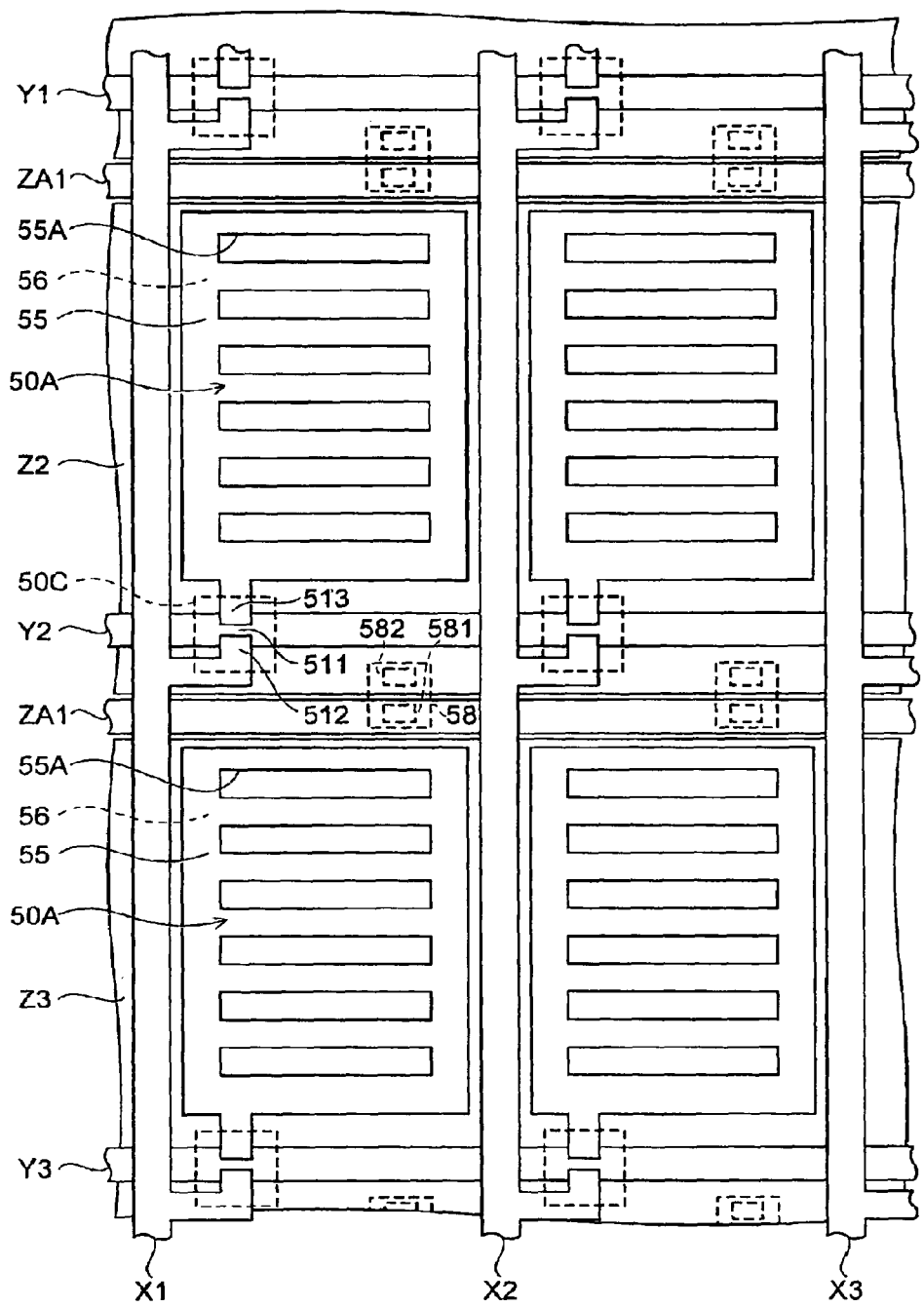
FIG. 10 is an enlarged plan view illustrating a pixel according to a third embodiment of the invention.

FIG. 10 is an enlarged plan view illustrating a pixel 50A according to a third embodiment of the invention.

The pixel 50A in the present embodiment is different from the pixel 50 in the first embodiment in that the pixel 50A includes an auxiliary common line ZA and a contact portion 58. Since other configurations are the same as those in the first embodiment, an explanation thereof will be omitted.

The auxiliary common line ZA is made of a conductive metal and is provided corresponding to a common electrode 56 that is provided separately for every horizontal line. This auxiliary common line ZA is formed along the scanning line Y. The auxiliary common line ZA may be formed using a material having an electrical resistance lower than the common electrode 56. For example, in the case when the common electrode is formed of a transparent conductive layer made of, for example, ITO, the auxiliary common line ZA may be formed using aluminum, titanium, or a laminated structure thereof. Alternatively, the auxiliary common line may be formed on the same layer as the scanning line Y and using the same material as the scanning line Y, such that the auxiliary common line can be provided without increasing the number of manufacture processes. Since the auxiliary common line ZA is provided at a place irrelevant to display between pixels, the auxiliary common line ZA does not need to be transparent unlike the common electrode 56.

The contact portion 58 is formed of a conductive metal. The contact portion 58 is connected to the auxiliary common line ZA in a region 581 and connected to the common electrode 56 and the common line Z through a contact hole provided in an insulating layer 63 in a region 582.

According to the present embodiment, the following effects are obtained.

(9) The auxiliary common line ZA formed of a conductive metal is provided corresponding to the common electrode 56 provided separately for every horizontal line and the common electrode 56, and the common line Z, and the auxiliary common line ZA are connected to one another through the contact portion 58 formed of a conductive metal. Therefore, it is possible to make the time constant of the common electrode 56 and the common line Z small.

Modifications

The invention is not limited to the embodiments described above, but various modifications or improvements may be made without departing from the scope and spirit of the invention. For example, in the embodiments described above, 320 rows of scanning lines Y and 240 columns of data lines have been provided. However, the invention is not limited thereto. For example, 480 rows of scanning lines Y and 640 columns of data lines may be provided.

Further, in the embodiments described above, the transmissive display has been performed. However, the invention is not limited thereto. For example, it may be possible to perform transflective display that utilizes both transmissive display using light from the backlight 41 and reflective display using reflective light of external light.

Furthermore, in the embodiments described above, the TFT 51 made of amorphous silicon has been used as a TFT. However, the invention is not limited thereto. For example, a TFT made of low-temperature polysilicon may be used.

Furthermore, in the embodiments described above, the insulating layer 64 is formed on the common electrode 56 and then the pixel electrode 55 is formed on the insulating layer 64. However, the invention is not limited thereto. For example, it may be possible to form the insulating layer 64 on the pixel electrode 55 and then form the common electrode 56 on the insulating layer 64. In this case, the slit provided in the pixel electrode in the first embodiment is provided in the common electrode. When the slit is provided in the common electrode, an area of the common electrode is reduced due to the slit, which increases a resistance. Accordingly, in this case, the auxiliary common line ZA in the third embodiment may be provided to decrease the time constant of the common electrode.

Furthermore, in the embodiments described above, the liquid crystal operates in the FFS mode. However, the invention is not limited thereto. For example, liquid crystal may operate in the IPS mode.

Furthermore, in the embodiments described above, the common electrode 56 is provided separately for every horizontal line. However, the invention is not limited thereto. For example, the common electrode 56 may be provided separately for every two horizontal lines or three horizontal lines. For example, in the case when the common electrode 56 is provided separately for every two horizontal lines, the control circuit 30 alternately supplies the voltage VCOML and the voltage VCOMH to two common lines Z connected to each common electrode 56. In addition, the data line driving circuit 20 performs positive polarity writing and negative polarity writing alternately every two horizontal lines corresponding to the common electrode 56.

Applications

Next, an electronic apparatus to which the above liquid crystal device 1 according to the first embodiment is applied will be described.

Figure 11:
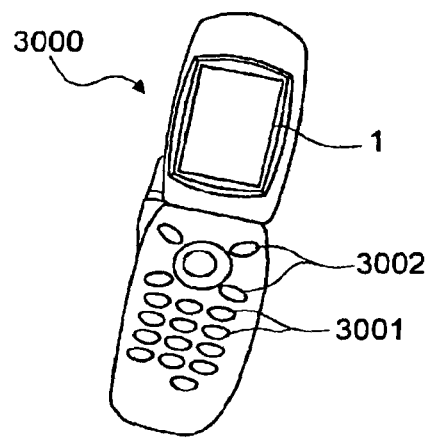
FIG. 11 is a perspective view illustrating the configuration of a mobile phone to which the liquid crystal device is applied.
Figure 12:
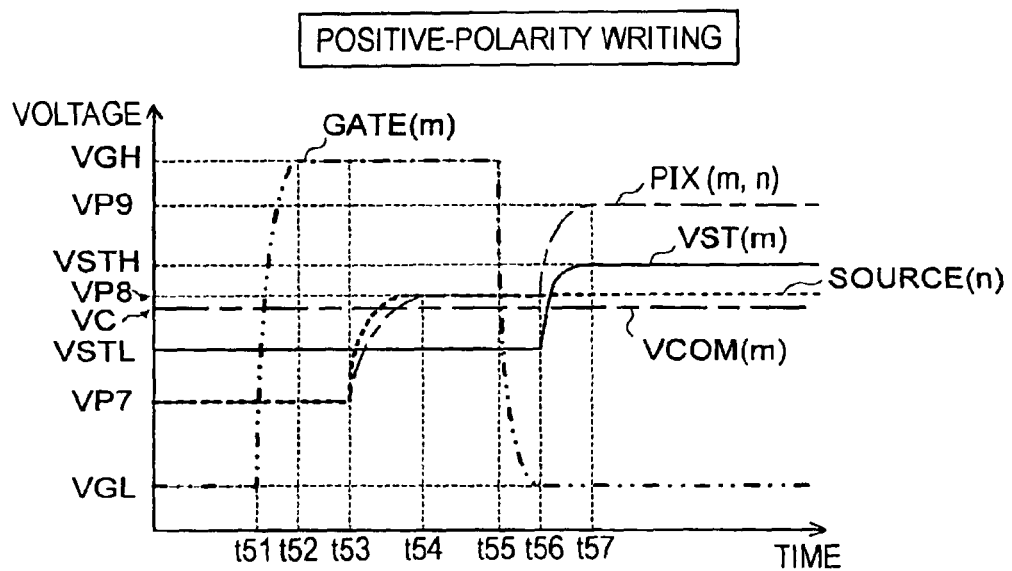
FIG. 12 is a timing chart illustrating the positive-polarity writing of a liquid crystal device in the related art.
Figure 13:
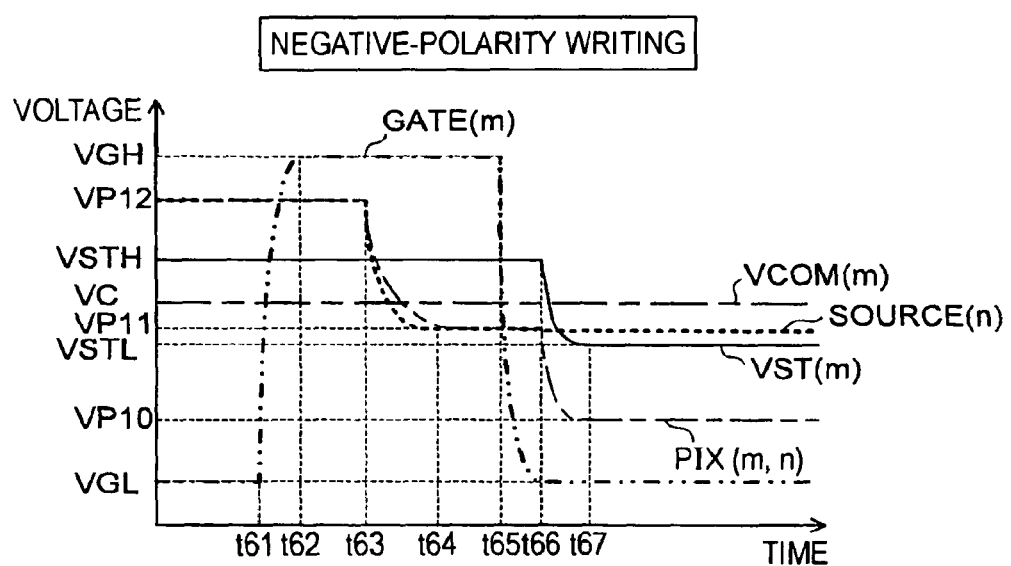
FIG. 13 is a timing chart illustrating the negative-polarity writing of the liquid crystal device in the related art.

FIG. 11 is a perspective view illustrating the configuration of a mobile phone to which the liquid crystal device 1 is applied. A mobile phone 3000 includes a plurality of operation buttons 3001, a plurality of scroll buttons 3002, and the liquid crystal device 1. A screen displayed on the liquid crystal device 1 is scrolled by operating the scroll buttons 3002.

An electronic apparatus to which the liquid crystal device 1 is applied includes a personal computer, a personal digital assistant, a digital still camera, a liquid crystal television, a view finder type or monitor direct view type video tape recorder, a car navigation system, a pager, an electronic diary, an electronic calculator, a word processor, a workstation, a video phone, a POS terminal, an apparatus having a touch panel, and the like, as well as that shown in FIG. 11. In addition, the liquid crystal device described above may be applied as a display unit of each of the various types of electronic apparatuses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. A liquid crystal device having a first substrate, a second substrate, and liquid crystal provided between the first substrate and the second substrate, comprising:
   a plurality of scanning lines provided in the first substrate or the second substrate;
   a plurality of data lines provided in the first substrate or the second substrate;
   a plurality of switching elements provided in correspondence with intersections of the plurality of scanning lines and the plurality of data lines;
   a plurality of pixel electrodes connected to the plurality of switching elements;
   a common electrode provided in correspondence with the pixel electrodes;
   a plurality of common lines respectively connected to corresponding one of a plurality of common electrodes;
   a control circuit that alternately supplies a first voltage and a second voltage higher than the first voltage to the common electrode through one of the common lines connected to the common electrode; and
   a data line driving circuit that alternately supplies to the data lines a positive-polarity image signal and a negative-polarity image signal of an image signal,
   wherein after a voltage supplied to said common electrode through the one of the common lines changes from the second voltage to the first voltage or from the first voltage to the second voltage and after a selection voltage is supplied to one of the plurality of scanning lines, a polarity of image signal supplied to the data lines is changed, and such changed image signal starts to be written into a pixel electrode,
   wherein just before the writing of the image signal, a polarity of the pixel electrode becomes the same as a polarity of the common electrode, and
   wherein the start timing of changing the value of the voltage delivered to said common electrode through the one of the common lines from the second voltage to the first voltage or from the first voltage to the second voltage is before the start timing of changing the value of the selection voltage.

2. The liquid crystal device according to claim 1,
   wherein the common electrode is formed in the first substrate.

3. The liquid crystal device according to claim 1,
   wherein the common electrode is provided as the plurality of common electrodes, and while one of the first and second voltages is being supplied to one of the plurality of common electrodes, the other one of the first and second voltages is supplied to another one of the common electrodes.

4. The liquid crystal device according to claim 3,
   wherein the common electrodes are provided for all horizontal lines.

5. The liquid crystal device according to claim 1,
   wherein the control circuit includes a unit control circuit to which a polar signal for selecting either the first voltage or the second voltage is supplied, and
   the unit control circuit includes:
   a latch circuit that holds the polar signal; and
   a selection circuit that selectively outputs any one of the first voltage and the second voltage according to the polar signal held by the latch circuit.

6. An electronic apparatus comprising the liquid crystal device according to claim 1.

7. A liquid crystal device having a first substrate, a second substrate, and liquid crystal provided between the first substrate and the second substrate, comprising:
- a plurality of scanning lines provided in the first substrate or the second substrate;
- a plurality of data lines provided in the first substrate or the second substrate;
- a plurality of switching elements provided in correspondence with intersections of the plurality of scanning lines and the plurality of data lines;
- a plurality of pixel electrodes connected to the plurality of switching elements;
- a plurality of common electrodes that are provided in the first substrate and are formed separately from each other;
- a plurality of common lines respectively connected to corresponding one of a plurality of common electrodes;
- a control circuit that alternately supplies a first voltage and a second voltage higher than the first voltage to the common electrode through one of the common lines connected to the common electrode; and
- a data line driving circuit that alternately supplies to the data lines a positive-polarity image signal and a negative-polarity image signal of an image signal,
- wherein after a voltage supplied to said common electrode through the one of the common lines changes from the second voltage to the first voltage or from the first voltage to the second voltage and after a selection voltage is supplied to one of the plurality of scanning lines, a polarity of image signal supplied to the data lines is changed, and such changed image signal starts to be written into a pixel electrode,
- wherein just before the writing of the image signal, a polarity of the pixel electrode becomes the same as a polarity of the common electrode, and
- wherein the start timing of changing the value of the voltage delivered to said common electrode through the one of the common lines from the second voltage to the first voltage or from the first voltage to the second voltage is before the start timing of changing the value of the selection voltage.

8. The liquid crystal device according to claim 1, wherein another selection voltage is supplied to a scanning line after the second voltage is supplied to the common electrode.

9. The liquid crystal device according to claim 8, wherein the negative-polarity image signal is supplied to the data lines after the other selection voltage is supplied to the scanning line.

10. The liquid crystal device according to claim 1, wherein the potential difference between the voltage of the common electrode and the voltage of the pixel electrodes is constant at all times during the time period beginning when the voltage of the common electrode starts to drop and ending when the voltage of the common electrode stops dropping.

11. The liquid crystal device according to claim 1, wherein the negative-polarity image signal and the positive-polarity image signal each have an electric potential higher than the first voltage and lower than the second voltage.

12. The liquid crystal device according to claim 1, wherein the voltage of the common electrode is maintained throughout a scanning period during which the selection voltage is supplied to the scanning lines.

13. The liquid crystal device according to claim 1, wherein the timing of transition of the voltage supplied to the common electrode is prior to the timing of transition of the voltage supplied to the pixel electrodes.

14. The liquid crystal device according to claim 1, wherein time period at the positive writing between the timing of transition of the voltage supplied to the common electrode and the timing of transition of the voltage supplied to the pixel electrodes is substantially identical to time period at the negative writing between the timing of transition of the timing of transition of the voltage supplied to the common electrode and the timing of transition of the voltage supplied to the pixel electrodes.

15. A method of driving a liquid crystal device having a plurality of scanning lines, a plurality of data lines, a plurality of switching elements provided in correspondence with intersections of the plurality of scanning lines and the plurality of data lines, a plurality of pixel electrodes connected to the plurality of switching elements, a common electrode provided in correspondence with the pixel electrodes, and a plurality of common lines respectively connected to corresponding one of a plurality of common electrodes, comprising:
- alternately supplying a first voltage and a second voltage higher than the first voltage to the common electrode through one of the common lines connected to the common electrode; and
- alternately supplying to the data lines a positive-polarity image signal and a negative-polarity image signal,
- wherein after a voltage supplied to said common electrode through the one of the common lines changes from the second voltage to the first voltage or from the first voltage to the second voltage and after a selection voltage is supplied to one of the plurality of scanning lines, a polarity of image signal supplied to the data lines is changed, and such changed image signal starts to be written into a pixel electrode,
- wherein just before the writing of the image signal, a polarity of the pixel electrode becomes the same as a polarity of the common electrode and
- wherein the start timing of changing the value of the voltage delivered to said common electrode through the one of the common lines from the second voltage to the first voltage or from the first voltage to the second voltage is before the start timing of changing the value of the selection voltage.

16. The liquid crystal device according to claim 1, wherein when the selection voltage is supplied to the one of the scanning lines during a negative-polarity writing, both polarities of the pixel electrode and the common electrode become positive, and
- when the selection voltage is supplied to the one of the scanning lines during a positive-polarity writing, both polarities of the pixel electrode and the common electrode become negative.

17. The method of driving a liquid crystal device according to claim 15,
- wherein the common electrode is provided as a plurality of common electrodes, and while one of the first and second voltages is being supplied to one of the plurality of common electrodes, the other one of the first and second voltages is supplied to another one of the common electrodes.

18. An electronic apparatus comprising the liquid crystal device according to claim 7.

19. The liquid crystal device according to claim 7,
- wherein the common electrodes are provided for each of at least one horizontal line.

20. The liquid crystal device according to claim 7,
- wherein while one of the first voltage and the second voltage higher than the first voltage is being supplied to one of the plurality of common electrodes, the other one of the first and second voltages is supplied to another one of the common electrodes.

21. The liquid crystal device according to claim 20, wherein the first and second voltages are alternately supplied to the plurality of common electrodes.

22. The liquid crystal device according to claim 7, further comprising:
   an insulating layer provided between the pixel electrodes and the common electrodes so as to form capacitors between the pixel electrodes and the common electrodes.

23. The liquid crystal device according to claim 7, further comprising:
   a second insulating layer provided between the first substrate and the pixel electrodes or the common electrodes.

24. The liquid crystal device according to claim 7, further comprising:
   an auxiliary common line electrically connected to each of the common electrodes.

\* \* \* \* \*